(12) United States Patent
Park et al.

(10) Patent No.: US 9,372,611 B2
(45) Date of Patent: Jun. 21, 2016

(54) ELECTRONIC DEVICE

(71) Applicant: LG ELECTRONICS INC., Seoul (KR)

(72) Inventors: Chala Park, Pyeongtaek-si (KR); Hyejin Choi, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 14/361,775

(22) PCT Filed: Nov. 30, 2012

(86) PCT No.: PCT/KR2012/010328
§ 371 (c)(1),
(2) Date: May 30, 2014

(87) PCT Pub. No.: WO2013/081423
PCT Pub. Date: Jun. 6, 2013

(65) Prior Publication Data
US 2014/0340341 A1    Nov. 20, 2014

(30) Foreign Application Priority Data

Dec. 1, 2011    (KR) .................. 10-2011-0127444

(51) Int. Cl.
| | |
|---|---|
| *G06F 3/041* | (2006.01) |
| *G06F 3/0484* | (2013.01) |
| *G06F 3/042* | (2006.01) |
| *G06F 3/0362* | (2013.01) |
| *G06F 3/01* | (2006.01) |
| *G09G 3/20* | (2006.01) |

(52) U.S. Cl.
CPC ............ *G06F 3/04847* (2013.01); *G06F 3/016* (2013.01); *G06F 3/0362* (2013.01); *G06F 3/0416* (2013.01); *G06F 3/0421* (2013.01); *G09G 3/2096* (2013.01); *G09G 2320/0606* (2013.01); *G09G 2320/0626* (2013.01); *G09G 2320/0666* (2013.01)

(58) Field of Classification Search
None
See application file for complete search history.

(56) References Cited

U.S. PATENT DOCUMENTS

| | | | |
|---|---|---|---|
| 6,225,976 B1 * | 5/2001 | Yates et al. ................. | 345/156 |
| 7,215,320 B2 * | 5/2007 | Takeuchi et al. ............. | 345/156 |
| 2007/0222765 A1 * | 9/2007 | Nyyssonen ................. | 345/173 |
| 2008/0158149 A1 * | 7/2008 | Levin ......................... | 345/156 |
| 2011/0142428 A1 | 6/2011 | Stenberg | |

FOREIGN PATENT DOCUMENTS

| | | |
|---|---|---|
| JP | 2001-157284 A | 6/2001 |
| JP | 2008-42481 A | 2/2008 |
| JP | 2009-258817 A | 11/2009 |
| KR | 10-2007-0003099 A | 1/2007 |
| KR | 10-2008-0070428 A | 7/2008 |

* cited by examiner

*Primary Examiner* — Srilakshmi K Kumar
*Assistant Examiner* — Stephen T Reed
(74) *Attorney, Agent, or Firm* — Birch, Stewart, Kolasch & Birch, LLP

(57) ABSTRACT

Disclosed is an electronic device. The electronic device comprises a display device; an input/output device which is separated from the display device and which operates as a means for providing visual information and as a means for inputting information through touch; and a controller which changes configuration setting value based on the touch on the input/output device, and which, upon receiving a predetermined form of touch through the input/output device, changes the sensitivity on the change of the configuration setting value relative to the touch on the input/output device.

16 Claims, 35 Drawing Sheets

ELECTRONIC DEVICE

TECHNICAL FIELD

The present invention relates to an electronic device and, more particularly, to an electronic device comprising an input/output device which is separated from a apart from a display device and which can operate as a means for providing visual information and as a means for inputting information through touch, and a method for driving the electronic device.

BACKGROUND ART

There have been growing interests in the user interface that enables a user to intuitively recognize information on the operating state of an electronic device, and to control the operating state of an electronic device easily. Moreover, user interface of an electronic device, in the aspect of design as well as in the aspect of convenience of users, is becoming more important as key factors affecting the user in selecting electronic products.

DISCLOSURE OF INVENTION

Technical Problem

The technical object of the present invention is to provide an electronic device that enables a user to intuitively recognize the information on the operating state of an electronic device through color information and a method of driving the electronic device.

Another technical object of the present invention is to provide an electronic device that enables a user to easily control the operating state of an electronic device and to intuitively recognize the result of control through color information and a method of driving the electronic device.

Another technical object of the present invention is to provide an electronic device which enables a user to intuitively recognize the information on the operating state of the device by using color information, and a method for driving the electronic device.

Yet another technical object of the present invention is to provide an electronic device which enables a user to easily control the operating state of the electronic device and intuitively recognize the result of the control, and a method for driving the electronic device.

Still another technical object of the present invention is to provide an electronic device which enables a user to easily change configuration setting value by using an input/output device which operates as a means for providing visual information separated from the display device, and a method for driving the electronic device.

The technical objects of the present invention are not limited to those described above, and other technical objectives could be clearly recognized by those skilled in the art from the following description on the present invention.

Solution to Problem

The electronic device according to the present invention aims to solve the above-mentioned problems, and can comprise a display, an input/output module and a controller. The input/output device can operate as a means for providing visual information which is separated from the display device, and as a means for inputting information through touch. The controller can change configuration setting value based on the touch on the input/output device, and, upon receiving a predetermined form of touch through the input/output device, change the sensitivity on the change of the configuration setting value relative to the touch on the input/output device.

To achieve the above-mentioned technical objective, the present invention provides a method for driving an electronic device which comprises a display device and an input/output device which is separated from the display device and which operates as a means for providing visual information and as a means for inputting information through touch, the method comprising the steps of changing the configuration setting value based on the touch on the input/output device; receiving a predetermined form of touch through the input/output device; and changing the sensitivity on the change of the configuration setting value against the movement of touch on the input/output device in response to the predetermined form of touch.

The method of driving the electronic device according to the present invention as described above can be implemented by computer programs in the way that can be performed by using various computer means, and recorded in computer-readable record media.

Advantageous Effects of Invention

By using the electronic device according to the present invention, users can intuitively recognize the operating states of an electronic device by checking the color information provided by the input/output module included in the electronic device.

Also, by using the electronic device according to the present invention, users can control the operating states of an electronic device, and can intuitively recognize the result of control of the operating states of an electronic device by checking the color information reflecting the result of control of the operating states of an electronic device provided by the input/output module included in the electronic device.

Also the user of the electronic device of the present invention can easily change the configuration setting value by using the input/output device which is separated from the display device and which operates as a means for inputting information through touch.

BRIEF DESCRIPTION OF DRAWINGS

FIG. 48 is a flow diagram illustrating the method of changing the configuration setting value through a touch on the input/output device in the electronic device of the present invention.

FIGS. 49-51 illustrate the types of touches for changing the sensitivity on the change of the configuration setting value against the movement of the touch on the input/output device according to the method of changing the configuration setting value as illustrated in FIG. 48.

MODE FOR THE INVENTION

Figure 1:
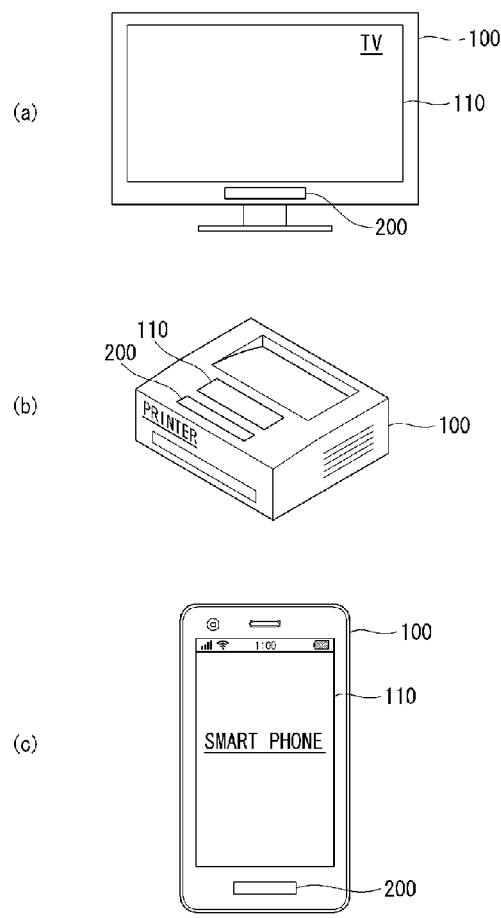
FIG. 1 illustrates an electronic device according to one embodiment of the present invention.

In order to appropriately understand the advantages of the present invention and the objectives to be achieved by the embodiments of the present invention, it is necessary to describe the invention with reference to drawings and contents of the drawings which illustrate preferred embodiments of the invention.

In the specification of the present invention, when constructing elements 'transmit or deliver' data or signal to other constructing elements, it is meant that the constructing element can directly transmit or deliver the data or signal to other constructing element, and can transmit or deliver the data or signal to other constructing element through at least one additional constructing element. Also, the terms "module" and "unit" used in the description below for the constructing elements of the invention are used for the convenience of the description of the specification and may be used interchangeably, and do not have different meanings or roles.

The objectives, features and advantages of the present invention will be clear through the following description referring to the drawings attached. The preferred embodiments of the present invention will be described with reference to the relevant drawings. The same numeral corresponds to the same constructing element in the specification. Also, explanation can be omitted if the description on publicly known facts or complicated description relating the construction of the present invention is considered to make the technical idea of the present invention unclear.

FIG. 1 illustrates an electronic device 100 according to one embodiment of the present invention. Referring to FIG. 1, the electronic device 100 according to the present invention can comprise a display device 110 and an input/output module 200. The display device 110 can display various information related to the operating states of the electronic device 100.

The input/output module 200 can provide color information reflecting the information related to the operating states of the electronic device 100. Also, the input/output module 200 can provide color information reflecting the information related to the operation of the electronic device 100 which is requested by external input information received by user's touch or manipulation of button, or the information related to the operation of the electronic device 100 which is modified by the external input information. In other words, the input/output module 200 can be used as a means for inputting or providing information related to the electronic device 100.

The electronic device 100 according to the present invention can be implemented through display devices such as TV and monitors as shown in FIG. 1 (a), Image forming devices such as printers, copiers and multi-functional devices as shown in FIG. 1 (b), mobile terminals such as smart phones, tablet PCs, note-book computers, PDAs (Personal Digital Assistants), MP3 players, PMPs (Portable Multimedia Players) and ebook readers as shown in FIG. 1 (c). Also, the electronic device 100 according to the present invention can be implemented through washing machines, refrigerators, air conditioners, cooking devices, electric iron, etc. The scope of the electronic devices of the present invention, however, is not limited to the devices described above.

As illustrated in FIG. 1, the input/output module 200 is arranged at least on some portion of a bezel area surrounding a display device 110 of TV or smart phone, or arranged near the display device 110 to serve the function of supplementary means for input and output of information.

The input/output module 200 can include a plurality of light emitting modules for emitting light of various colors, and provide information related to the electronic device 100 by using the light itself emitted from the plurality of light emitting modules, or provide information related to the electronic device 100 by composing the lights emitted from the plurality of light emitting modules.

Also, the input/output module 200 can control at least one of color or intensity of the color emitted from each of the plurality of light emitting modules based on external input signal such as user's touch or button manipulation. In other words, the electronic device 100 can provide the effect of interactive information service in response to the external input signal through the input/output module 200. More specifically, the input/output module 200 can control at least one of color or intensity of the color emitted from the corresponding light emitting modules of the plurality of light emitting modules based on the information such as the number of touches, intensity of the touch or duration of the touch.

Meanwhile, the input/output module 200 can be equipped with a plurality of input keys (not illustrated) for enabling input of various input activities. The plurality of input keys can be represented on the substrate of the input/output module 200 by using printing method. If a touch is input on the location where a specific key is represented, the input/output module 200 can acquire specific information corresponding to the specific input key.

Figure 2:
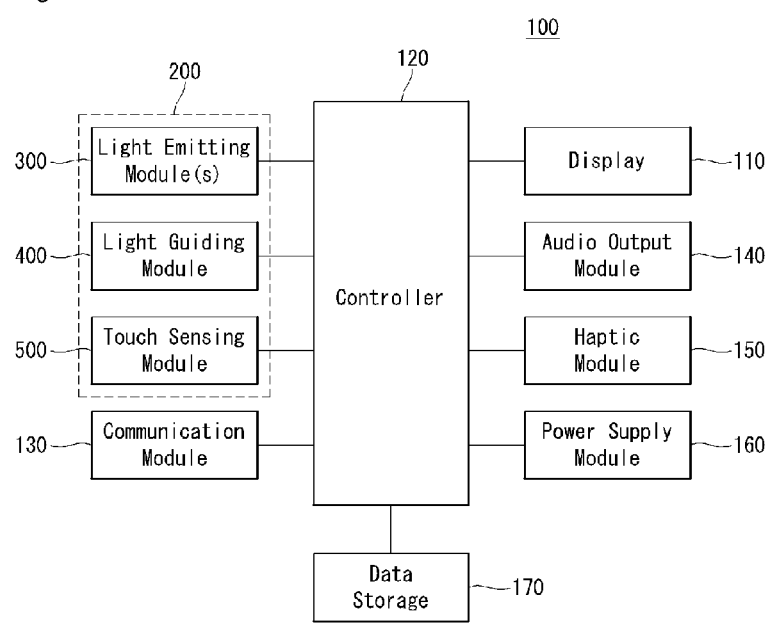
FIG. 2 is a block diagram of the input device included in the electronic device illustrated in FIG. 1.

FIG. 2 is a block diagram of the input device included in the electronic device illustrated in FIG. 1. Referring to FIG. 2, the electronic device 100 can include a display device 110, a controller 120, a communication module 130, an audio output module 140, a haptic module 150, a power supply module 160, a storing unit 170, and an input/output module 200. The constructing elements illustrated in FIG. 2 are not essential elements, and the electronic device 100 according to the present invention can have more or less constructing elements than are illustrated in FIG. 2.

The display device 110, as described above, can display the information processed by the electronic device 100. The display device 110 can include at least one of liquid crystal display, thin film transistor-liquid crystal display, organic light-emitting diode, flexible display and 3D display.

There can be two or more display devices 110 depending on the implementation method of the present invention. For example, a plurality of displays can be arranged separately or in one body on one surface of the electronic device 100, or on different surfaces respectively.

In the case where the sensor (referred to as 'touch sensor'), which detects the touch action on the display device 110, has inter-layer structure (referred to as 'touch screen'), the display unit 151 can also be used as an input device as well as an output device. The touch sensor, for example, can have the form of touch film, touch sheet, touch pad, etc.

A proximity sensor can be arranged on the interior area of the electronic device 100 surrounded by the touch screen or near the touch screen. The proximity sensor is a sensor that detects whether there is any object that is present or approaching a predetermined detecting surface without mechanical contact by using electromagnetic force or infrared lights.

The controller 120 controls the overall operation of the electronic device 100.

The communication module 130 can include one or more modules for forming a communication network with other electronic devices, or to connect to various networks. Although not illustrated in FIG. 2, the communication module 130 can include a broadcast receiving module, a mobile communication module, a wireless Internet module, a near field communication module, a location information module, etc.

The broadcast receiving module receives broadcast signal and/or broadcast-related information from external broadcast managing server or broadcast transmission antenna through broadcast channel. The mobile communication module transmits and receives wireless signal through mobile communication with at least one of a base station, external terminal and server. The wireless Internet module means a module for wireless Internet connection, which can be built in the electronic device 100 or an external device.

The near field communication module is a module for near field communication. For the near field communication technology, Bluetooth, RFID (Radio Frequency Identification), infrared Data Association (IrDA), UWB (Ultra Wideband) or ZigBee can be used. The location information module is a module for identifying or obtaining the location of a mobile terminal. The location information module can use Global Navigation Satellite System (GNSS) to acquire location information.

The audio output module 140 can output various audio data which is received through the communication module 130, stored in the storing unit 170, or processed by the controller 120.

The haptic module 150 generates a variety of haptic effects a user can feel. Typical example of the haptic effect generated by the haptic module 150 is the vibration. The intensity and pattern of the vibration generated by the module 150 can be controlled. For example, the haptic module 150 can output different vibrations sequentially, or compose the different vibrations and output the composed vibration. The haptic module 150 can generate, in addition to vibration, various haptic effects such as the effect by the stimulus of an array of pins moving perpendicularly with the surface contacting the skin, effect by the stimulus of exhale or inhale of air through outlet or inlet hole, effect by the stimulus of brushing the skin, effect by the stimulus of contacting with an electrode, effect by the stimulus using the force of static electricity, effect by the feeling of cold or hot using heat-absorbing or heat-emitting devices, and so on.

The storing unit 170 can store programs for the operations of the controller 120, and store input and output data temporarily or permanently. Especially, the storing unit 170 can store multiple operating modes of the electronic device 100 and multiple emitting patterns corresponding to each of the multiple operating modes.

When the electronic device 100 enters a specific operation mode, the controller 120 can control the operation of the input/output module 200 of emitting lights according to multiple emitting patterns stored. Then, the user can recognize the operating state of the electronic device 100 intuitively through the color information provided according to the light emitting operation of the input/output module 200.

In the case where the electronic device 100 is a printer, the multiple operating modes can include booting mode, wait mode, power save mode, cleaning mode, data receiving mode, image forming mode, set-up mode and external device connection mode, etc.

The storing unit 170 can also store multiple operating modes of the electronic device 100, at least one input pattern corresponding to each of the multiple operating modes, at least one emitting pattern corresponding to the at least one input pattern. At this step, the input means can be a touch sensing module which detects at least one of direct touch and near field touch.

In the state where the electronic device 100 entered a specific operating mode of the multiple operating modes, if a specific input pattern corresponding to the specific operating mode is received through the input means, the controller 120 can control the light emitting operation of the input/output module 200 according to the emitting pattern corresponding to the input pattern received. Then, the user can recognize the operating state of the electronic device 100 intuitively through the color information provided by the light emitting operation of the input/output module 200.

The storing unit 170 can include at least one type of storing medias from flash memory type, hard disk type, multimedia card, micro type, card type memory (e.g., SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory) magnetic memory, magnetic disc, and optical disc. Also, the electronic device 100 according to the present invention can operate in connection with a web storage performing the function of the storing unit 170 on the Internet.

Power supplying unit 160 can supply power necessary for the operation of each constructing element by introducing power from internal or external source by the control of the controller 120.

The input/output module 200 can provide color information reflecting information related to the operating state of the electronic device 100. The input/output module 200 can also provide color information reflecting information related to the operating state of the electronic device 100 changed by the external input information.

The input/output module 200 can include a light emitting module 300, a light guiding module 400 and a touch sensing module 500. The light emitting module 300 can be implemented by single light emitting module that can emit light of one or multiple colors, or multiple light emitting modules that can emit light of colors which are different among the modules. At least one of intensity and color of the light emitted from at least one of the light emitting module 300 can be changed by the control of the controller 120.

The light guiding module 400 performs the function of guiding lights emitted from the light emitting module 300. The light guiding module 400 can include one or more of light guiding passages which guide lights emitted from the corresponding light emitting module of the multiple light emitting module and which include light penetrating area on at least part thereof. Also, the light guiding module 400 can mix lights of different colors emitted from multiple light emitting modules, and include at least one light guiding passage including at least part of light penetrating area.

The touch sensing module 500 can detect at least one of direct touch and near field touch, and transmit detection result to the controller 120. Then, the controller 120 can control at least one of color and intensity of the light emitted from at least one of the light emitting module 300 according to the touch sensing result. The controller 120 can also control at least one of color and intensity of the light emitted from the light emitting module 300 based on the number, intensity, area size or duration of the touch received through the touch sensing module 500.

The touch sensing module 500 can be a part of a user input unit (not illustrated). The user input unit generates input data by a user for controlling the operation of the electronic device 100. The user input unit can comprise key pad, dome switch, touch pad (resistive/capacitive), jog wheel, jog switch, etc., in addition to above mentioned touch sensing module 500.

The operation of information input and output through the input/output module 200 of the electronic device 100 according to the present invention and the construction of the electronic device 100 have been briefly described with reference to FIGS. 1 and 2. The function of information input and output implemented by the input/output module 200 according to the embodiment of the present invention will now be described in more detail with reference to FIG. 3 FIG. 41.

Figure 3:
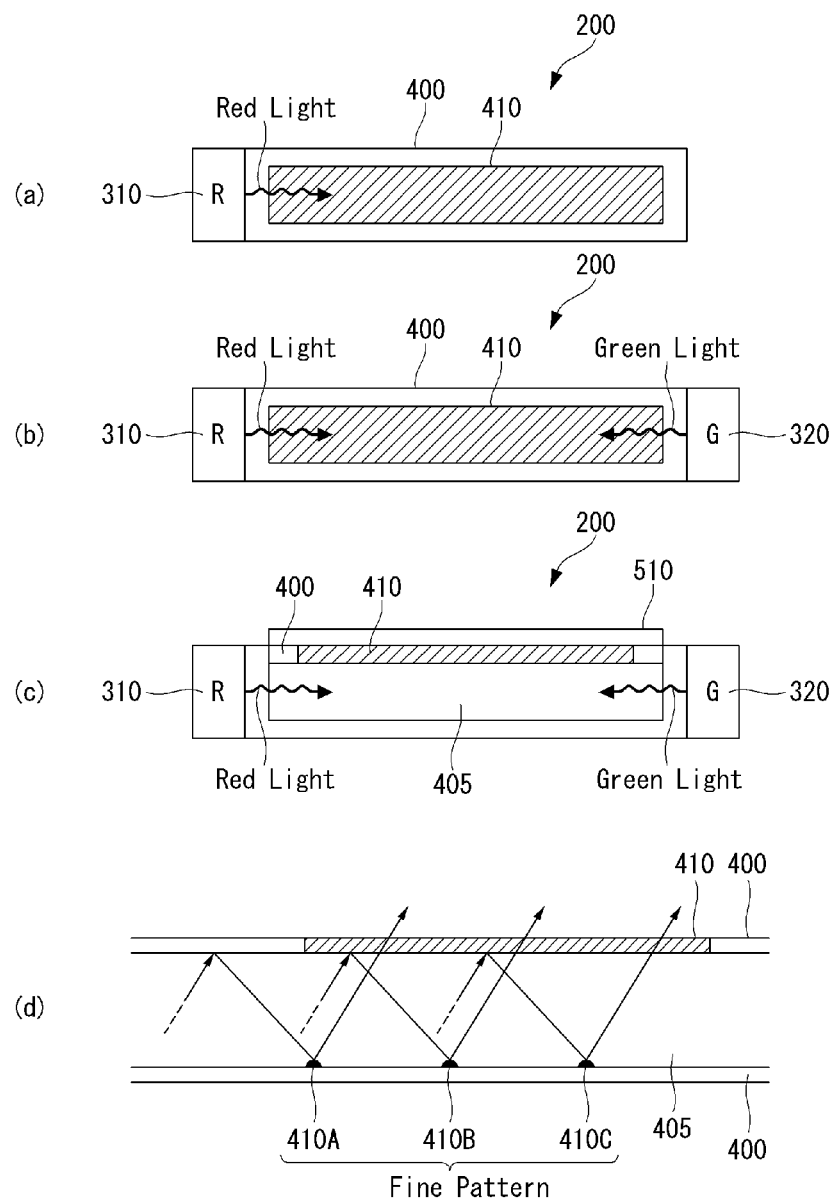
FIG. 3 shows plane views and cross-sectional views of various examples of the input/output modules included in the electronic device of the present invention.

FIG. 3 shows plane views and cross-sectional views of various examples of the input/output modules included in the electronic device of the present invention. It should be noted that although the light emitting modules 310, 320 illustrated in FIG. 3 can be implemented by emitting diodes each of which emits lights of corresponding colors, the scope of the present invention is not limited to this implementation.

First, FIG. 3 (a) is a plane view of the input/output module 200 which includes one light emitting module 310 emitting red light. Referring to FIG. 3 (a), the input/output module 200 includes a light guiding module 400 which guides the light emitted from the light emitting module 310. The light guiding module 400 includes a light penetrating area 410 through which the red light emitted from the light emitting module 310 is penetrated. Various information related to the operation of the electronic device 100 can be provided to a user through the light penetrating through the light penetrating area 410. The light penetrating area 410 will described in more detail below with reference to FIG. 3 (d).

Assume, for example, that the input/output module 200 illustrated in FIG. 3 (a) is set to represent the volume of the audio signal output from the audio output module 140 of the electronic device 100. In this case, the controller 120 can control the light emitting module 410 so that the red light emitted from the light emitting module 410 is guided by the distance corresponding to the volume of the audio signal, and provided to the user through the light penetrating area 410 of the light guiding module 400.

FIG. 3 (b) is a plane view of the input/output module 200 including the first light emitting module 310 which emits red light, and the second light emitting module 320 which emits green light. FIG. 3 (c) is a cross-sectional view of the input/output module 200 illustrated in FIG. 3 (b). Referring to FIGS. 3 (b) and (c), it can be recognized that the input/output module 200 is arranged so that the lights emitted from the first light emitting module 310 and the second light emitting module 320 are guided in the opposite direction. Also, referring to FIG. 3 (c), light penetrating area 410 for enabling part of light to penetrate is formed on the part of the light guiding passage 405 which is a space for guiding light.

The red light emitted from the first light emitting module 310 and the green light emitted from the second light emitting module 320 can be mixed by the light guiding module 400. Therefore, the red light, green light and the mixed light can be provided to a user through the light penetrating area 410 in the light guiding module 400.

Assume that the input/output module 200 illustrated in FIG. 3 (b) is set so that the center of mixed light, which is yellowish light by mixing the red light and the green light, represents the volume of the audio signal output through the audio output module 140 of the electronic device 100. In this case, the controller 120 controls the electric signal introduced into the first light emitting module 310 and second light emitting module 320 so that the center of the mixed light is located at the location corresponding to the volume of the audio signal.

In the input/output module 200 of FIGS. 3 (a) and (b), unlike FIG. 3 (c), the touch sensing pad 510 that can be included in the input/output module 200 is not illustrated for the purpose of only explaining light emitting characteristics. The touch sensing pad 510 is part of the touch sensing module 500 illustrated in FIG. 1, and can detect both direct and indirect touch.

When touch on specific location of the touch sensing pad 510 is detected, the controller 120 of the electronic device 100 can provide feedback of the touch on specific location itself to the user through the input/output module 200. For example, the input/output module 200 in FIG. 3 (a) can control the electric signal introduced into the light emitting module 310 so that the red light emitted from the light emitting module 310 is guided to the specific location. For example, the input/output module 200 in FIG. 3 (b) can control the electric signal introduced into the first light emitting module 310 and the second light emitting module 320 so that the center of the mixed light is located at the specific location.

It is possible to set the touch on specific region of the touch sensing pad 510 to request of specific operation information of the electronic device 100. In this case, when touch on the specific region is detected, the controller 120 can control the input/output module 200 in FIGS. 3 (a) and (b) so that the information corresponding to the specific operation information is provided to the user.

FIG. 3 (d) shows the mechanism in which the guided light is provided to the user from the light guiding passage 405 through penetrating the light penetrating area 410 in the light guiding module 400. Referring to FIG. 3 (d), it can be seen that the lower part of the light guiding module 400 includes multiple fine patterns 410A, 410B, 410C. If the fine patterns 410A, 410B, 410C are not present, the light emitted from the light emitting module is guided to the end of the light guiding module 400 through total reflection without penetrating the light penetrating area 410.

However, part of the light which is emitted from the light emitting module and reaches the fine patterns 410A, 410B, 410C can transmitted to the user through scattered reflection by penetrating the light penetrating area 410. The arrows in FIG. 3 (*d*) indicate the flow of light which is scattered by the fine patterns and penetrates the light penetrating area 410.

While the amount of light which is provided to the user by penetrating the light penetrating area 410 increases as the density of fine patterns included in the lower part of the light guiding module 400 increases, the amount of light which is provided to the user by penetrating the light penetrating area 410 decreases as the distance from the light emitting module increases. Also, if the intensity of the light emitted from the light emitting module is lower than certain amount, light can be provided to the user by penetrating the region of the light penetrating area 410 which is near to the light emitting module. Therefore, it is necessary to decide the density of the fine patterns included in the light guiding module 400 in consideration of the characteristics described above and the operational characteristics of the electronic device including the light guiding module 400.

Also, specific shapes can be formed by the light penetrating the light penetrating area 410 according to the arrangement of the fine patterns in the light guiding module 400. For example, the shape of specific characters or marks can be formed by the light penetrating the light penetrating area 410 by arranging the fine patterns in the shape of specific characters or marks.

It is assumed in the present specification that the light emitted from the light emitting module is scattered, as described above, by the fine patterns included in the light guiding module and penetrates the light penetrating area. The scope of the present invention, however, is not limited to this arrangement. Also, fine patterns included in the light guiding module will not be illustrated in following drawings unless specifically necessary.

Figure 4:
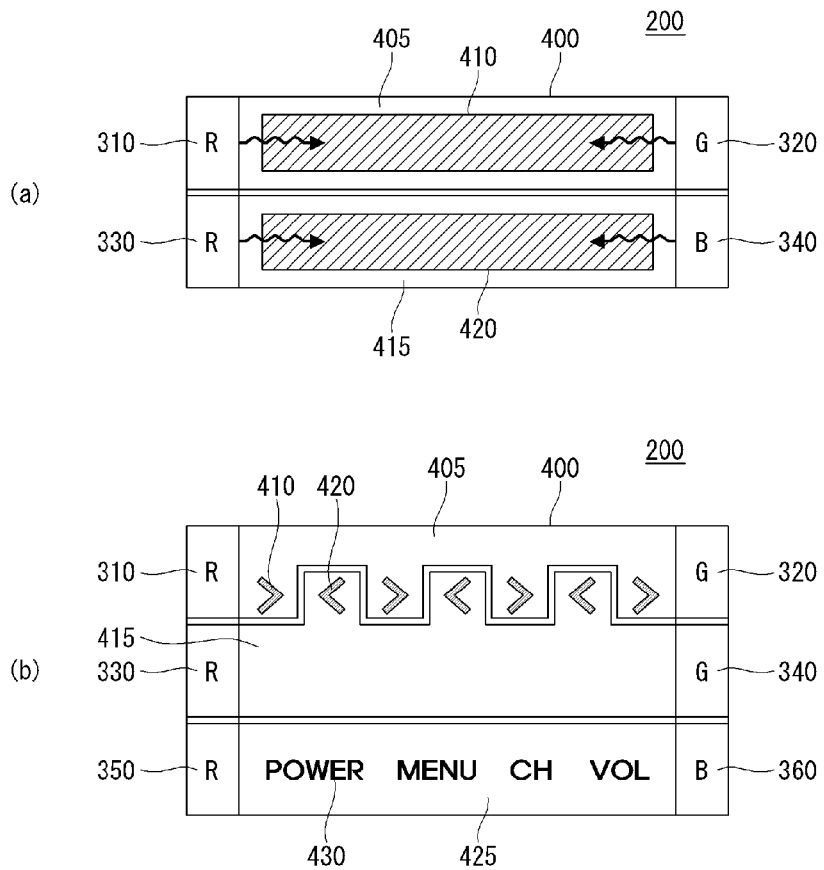
FIG. 4 illustrates another example of the input/output module included in the electronic device of the present invention.

FIG. 4 illustrates another example of the input/output module 200 included in the electronic device 100 of the present invention. It may be noted that the input/output module 200 illustrated in FIG. 4 includes multiple emitting layers arranged on the same plane.

Referring to FIG. 4(*a*), it can be seen that the input/output module 200 includes a plurality of light emitting modules 310, 320, 330, 340, and a pair of light guiding passages 405, 415 for guiding the lights emitted from the pair of the light emitting module corresponding to the plurality of light emitting modules 310, 320, 330, 340 in the opposite direction.

Part of each of the light guiding passages 405, 415 includes light penetrating areas 410, 420, and the light representing the information related to the operation of the electronic device 100 can be provided to the user through the light penetrating area 410, 420. For example, the first emitting layer including the first light emitting module pair 310, 320 and the first light guiding passage 405 can be used to provide the information related to the first operation of the electronic device 100, and the second emitting layer including the second light emitting module pair 330, 340 and the second light guiding passage 415 can be used to provide the information related to the second operation of the electronic device 100.

Referring to FIG. 4 (*b*), the input/output module 200 includes the first emitting layer including the first light emitting module pair 310, 320 and the first light guiding passage 405, the second emitting layer including the second light emitting module pair 330, 340 and the second light guiding passage 415, and the third emitting layer including the third light emitting module pair 350, 360 and the third light guiding passage 425.

Although the shape and arrangement of the light penetrating area 410, 420 in the first emitting layer and the second emitting layer is different, the color of the light used to provide information and the emitting position relative to the light guiding passage is identical. Therefore, the first emitting layer can be used to represent increase in the amount of the same information, and the second emitting layer can be used to represent decrease in the amount of the same information. Then, the user can recognize the operating state information of the electronic device 100 intuitively only by the color information provided by the input/output module 200.

Meanwhile, in the case where the color and emitting location of the color used in the first emitting layer and the second emitting layer is different, the first emitting layer and the second emitting layer can be used to provide information which is contrary to each other. For example, the first emitting layer can be used to represent booting process, and the second emitting layer can be used to represent the process of powering off the electronic device 100. Then, the user can recognize the operating state of the electronic device 100 intuitively only by the color information provided by the input/output module 200.

The third emitting layer can represent the information provided through the first and the second emitting layers by using the light penetrating area 430 through which the light or combination of lights emitted from the light emitting module pair 350, 360 passes, or the location of the touch for controlling the operation of the electronic device 100. In this process, it is assumed that the input/output module 200 illustrated in the FIG. 4 (*b*) also includes the touch sensing pad (not illustrated).

For example, when the user touches the portion of 'POWER' in the light penetrating area 430 of the third emitting layer, the controller 120 of the electronic device 100 can supply power to the electronic device 100 or stop supplying power to the electronic device 100 in response to the touch.

Figure 5:
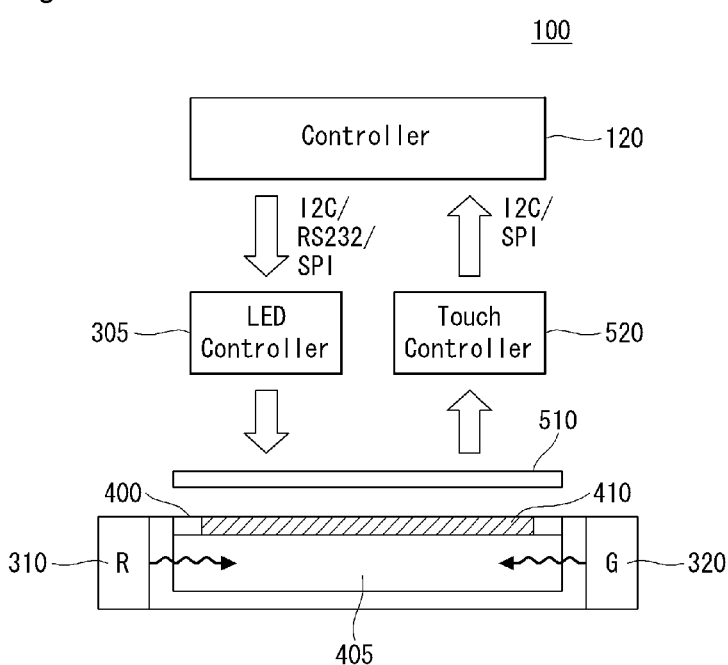
FIG. 5 conceptually explains the process for controlling the operation of the electronic device by using the input/output module of the electronic device of the present invention, and the process for providing information related to the operation of the electronic device.

FIG. 5 conceptually explains the process for controlling the operation of the electronic device 100 by using the input/output module 200 of the electronic device 100 of the present invention, and the process for providing information related to the operation of the electronic device 100. It may be noted that only the constructions of the light emitting module 300 and touch sensing module 500 of the electronic device 100, which is necessary to briefly explain the above description, are illustrated in FIG. 5.

First, the process in which the electronic device 100 simply provides the information related to the electronic device 100 by using the input/output module 200 will be described. The controller 120 of the electronic device 100 transmits the electric signal (i.e., the control signal or drive signal) generated based on the information representing the operating state of the electronic device 100 to the LED controller 305. In other words, it is assumed that, in the electronic device 100 according to the present invention in FIG. 5, the light emitting module 300 includes LED module, and the LED module 300 is controlled by the LED controller 305.

As illustrated in FIG. 5, 12C (Inter-Integrated Circuit), RS232 (Recommended Standard 232), SPI (Serial Peripheral Interface), etc. can be used as the interface between the controller 120 and the LED controller 305. The LED controller 305, upon receiving the control signal, transmits the control signal to the LED pair 310, 320 to control lighting of the LED pair 310, 320.

Then, the light emitted from the LED pair 310, 320 is guided through the light guiding passage 405, and part of the emitted light is provided to the user by penetrating the light penetrating area 410 of the light guiding module 400. In this case, the information provided by the light penetrating the light penetrating area 410 can be the information related to the electronic device 100.

Also, the controller 120 can also transmit the control signal generated based on the information representing the operating state of the electronic device 100 in response to the information on the location or movement of the touch received through the touch sensing pad 510 to the LED controller 305.

Secondly, an example of the process in which the operating state of the electronic device 100 is controlled by the touch information received through the touch sensing pad 510. When user's touch on the touch sensing pad 510 is detected, the touch controller 520 transmits the information on the location and movement of the user's touch to the controller 120.

Then, the controller 120 can control the operating state of the electronic device 100 based on the information on the location and movement of the user's touch. Also, the controller 120 can transmit the control signal reflecting the result of control on the operating state to the LED controller 305, and provide the result of control on the operating state to the user through the input/output module 200.

Figure 6:
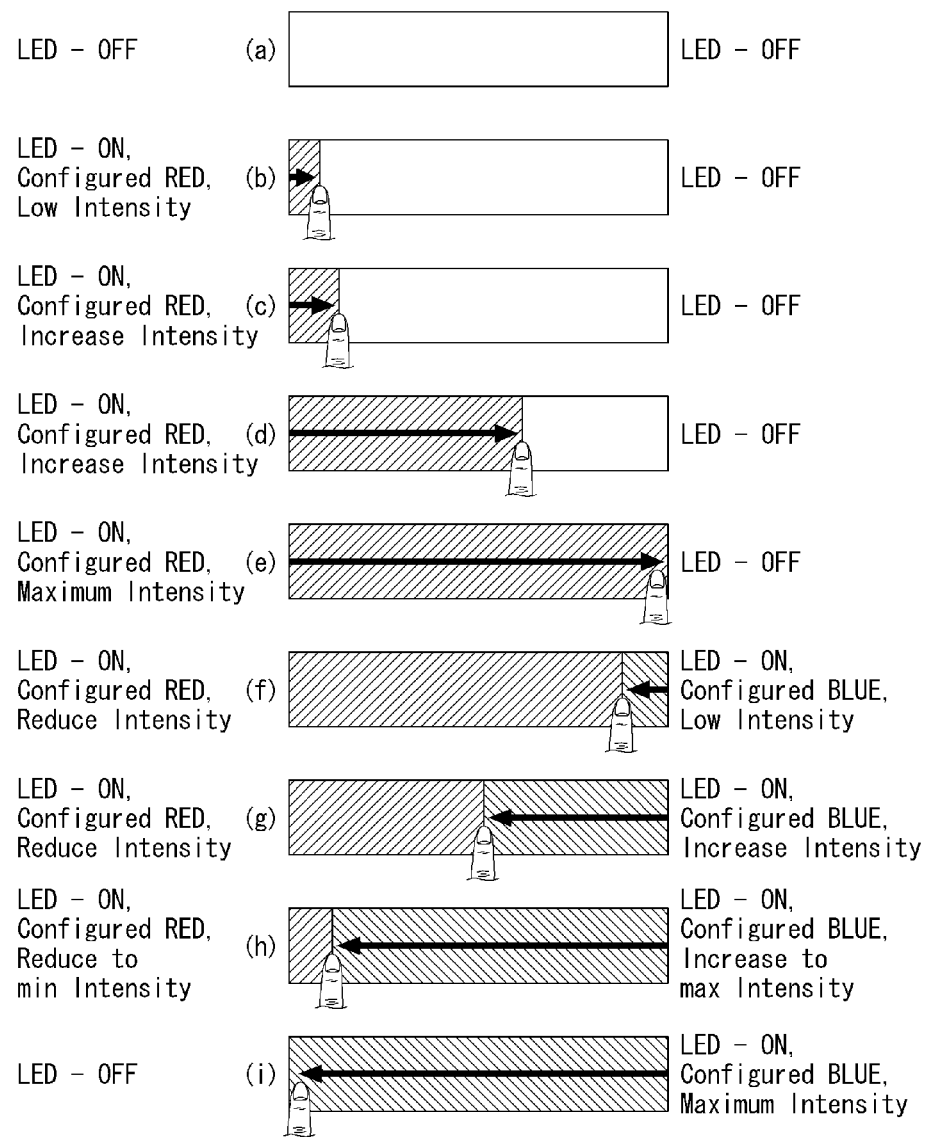
FIG. 6 illustrates the example where the light emitting shape of the input/output module including the first LED emitting red light and the second LED emitting blue light is changed by user's touch.

FIG. 6 illustrates the example where the light emitting shape of the input/output module 200 including the first LED emitting red light and the second LED emitting blue light is changed by user's touch. It should be noted that mixing of emitted lights is not considered in FIG. 6 which conceptually illustrates that the intensity of emitted light can be controlled by the user's touch.

Referring to FIG. 6 (a) through FIG. 6 (e), it can be seen that, as a user moves the touch from left to right, the intensity of red light emitted from the first LED increases. Referring to FIG. 6 (f) through FIG. 6 (i), it can be seen that, as a user moves the touch from right to left from the state shown in FIG. 6 (e), the intensity of red light emitted from the first LED decreases while the intensity of blue light emitted from the second LED increases. The method for controlling the emitting shape in the input/output module 200 illustrated in FIG. 6 is just one embodiment of the present invention, and does not limit the scope of the present invention into the above method.

Figure 7:
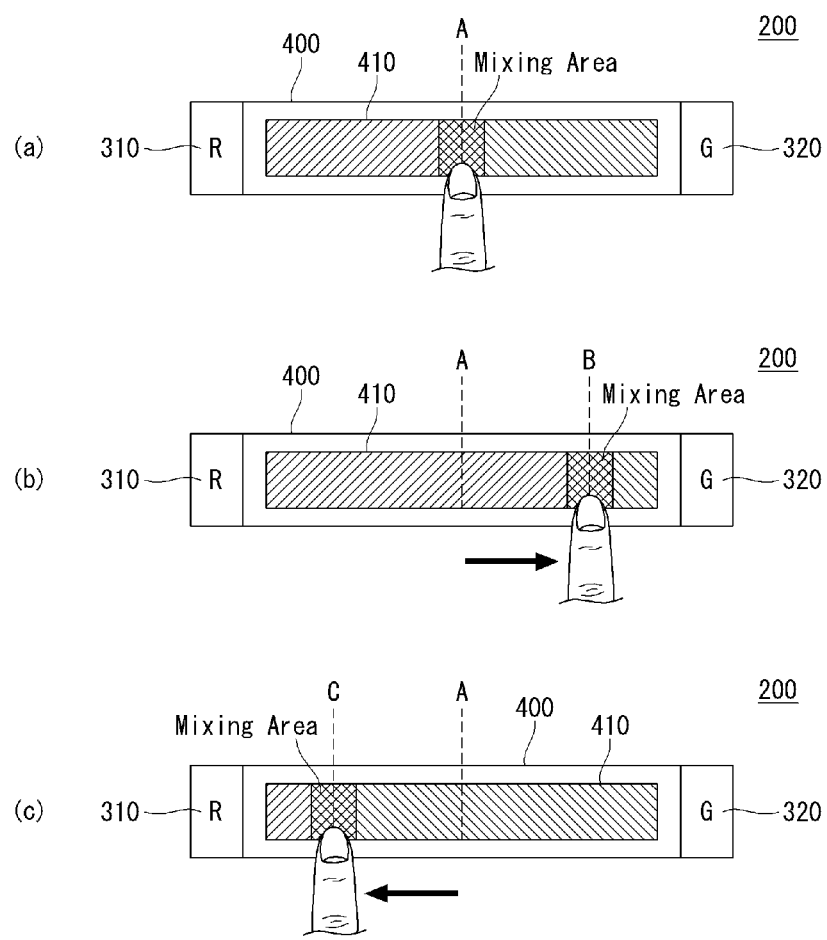
FIG. 7 illustrates the movement of the mixing area of light emitted from the light emitting module pair as the touch on the input/output module moves.

FIG. 7 illustrates the movement of the mixing area of light emitted from the light emitting module pair 310, 320 as the touch on the input/output module 200 moves.

Figure 8:
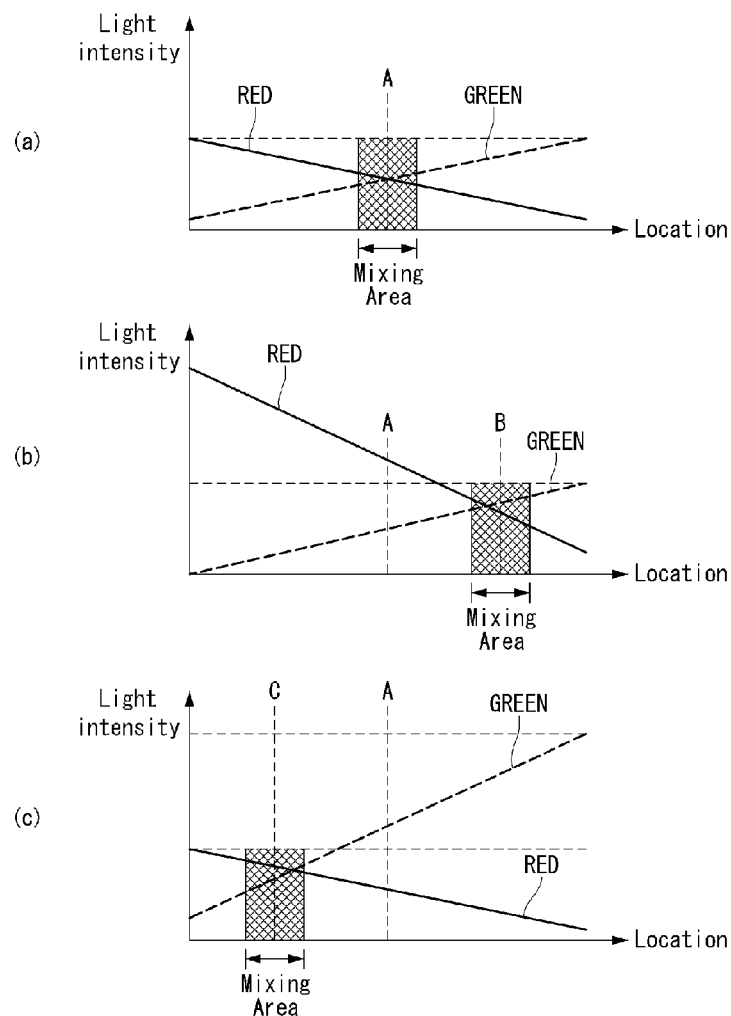
FIG. 8 conceptually illustrates the mechanism of moving the mixing area of light emitted from the light emitting module pair as illustrated in FIG. 7.

FIG. 8 conceptually illustrates the mechanism of moving the mixing area of light emitted from the light emitting module pair 310, 320 as illustrated in FIG. 7.

Referring to FIG. 7 (a), the mixing area of light emitted from the light emitting module pair 310, 320 is seen to be formed on a certain area centering around the location A when a user touches the location A of the input/output module 200.

Referring to FIG. 8 (a), it can be seen that, upon receiving touch information on the location A by a user, the controller 120 of the electronic device 100 according to the present invention controls the intensity of lights emitted from the first light emitting module 310 and second light emitting module 320 so that the mixing area of the red light emitted from the first light emitting module 310 and the green light emitted from the second light emitting module 320 is formed centering around the location.

Referring to FIGS. 7 (a) and (b), it can be seen that, as a user moves the touch on the input/output module 200 from the location A to the location B, the center of the mixing area of lights emitted from the light emitting module pair 310, 320 moves from the location A to the location B.

Referring to FIG. 8 (b), it can be seen that, as a user moves the touch on the input/output module 200 from the location A to the location B, the controller 120 increases the intensity of red light emitted from the first light emitting module 310 so that the center of the mixing area of lights emitted from the light emitting module pair 310, 320 moves from the location A to the location B.

Referring to FIGS. 7 (a) and (c), it can be seen that, as a user moves the touch on the input/output module 200 from the location A to the location C, the center of the mixing area of lights emitted from the light emitting module pair 310, 320 moves from the location A to the location C.

Referring to FIG. 8 (c), it can be seen that, as a user moves the touch on the input/output module 200 from the location A to the location C, the controller 120 increases the intensity of green light emitted from the second light emitting module 320 so that the center of the mixing area of lights emitted from the light emitting module pair 310, 320 moves from the location A to the location C.

The method of controlling the shape of emitted light from the input/output module 200 illustrated in FIGS. 7 and 8 is just one embodiment of the present invention, and does not limit the scope of the present invention into the above method.

Figure 9:
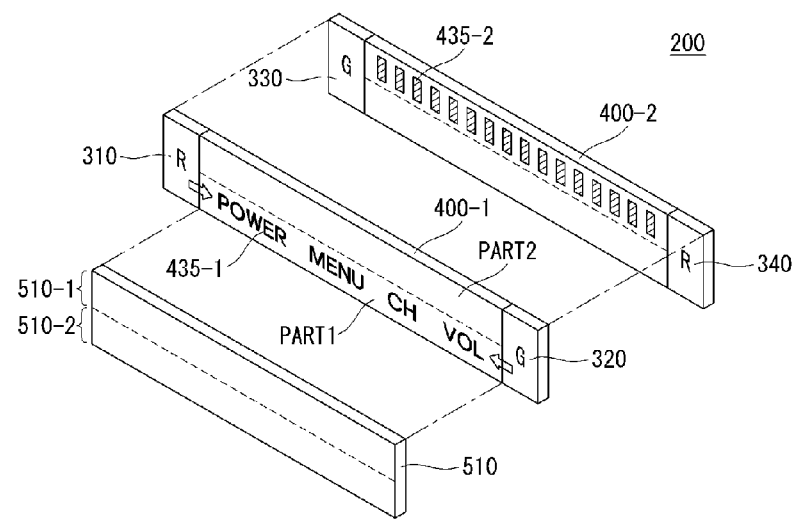
FIG. 9 illustrates another example of the input/output module of the electronic device according to the present invention.

FIG. 9 illustrates another example of the input/output module 200 of the electronic device 100 according to the present invention. The input/output module 200 illustrated in FIG. 9 adopts multi-layer structure in which a plurality of layers are arranged on different surfaces which are separated perpendicularly, rather than being arranged on the same surface like the examples described above.

Referring to FIG. 9, it can be seen that the input/output module 200 includes the first emitting layer which includes a touch sensing pad 510, the first light emitting device pair 310, 320 and the first light guiding passage 400-1, and the second emitting layer which is arranged under the first emitting layer and includes the second light emitting device pair 330, 340 and the second light guiding passage 400-2.

The light emitted from the first light emitting device pair 310, 320 is guided through the first light guiding passage 400-1, and the guided light passes through the light penetrating area 435-1 formed on the first part (PART 1) and then provided to the user. In other words, while the first part (PART 1) includes fine patterns arranged in it to cause scattered reflection of the guided lights, the second part (PART 2) does not include fine patterns so that the lights are merely guided through total reflection without scattering. This is the same in the light guiding passage 400-1 of FIG. 10.

The first light guiding passage 400-1 is preferably transparent or translucent. The reason is that the lights passing through the light penetrating area 435-2 of the second emitting layer should be provided to the user. Also, at least the light penetrating area of the second light guiding passage 400-2 should be transparent or translucent.

The touch sensing pad 510 can also be divided into a first touch sensing area 510-1 corresponding to the first emitting layer and a second touch sensing area 510-2 corresponding to the second emitting layer, as illustrated in FIG. 9. For example, the touch on the first touch sensing area 510-1 can be allocated to receive the touch for selecting the control function represented by the light penetrating area 435-1 of the first emitting layer, and the second touch sensing area 510-2 can be allocated to receive the touch to perform the control function selected above.

Figure 10:
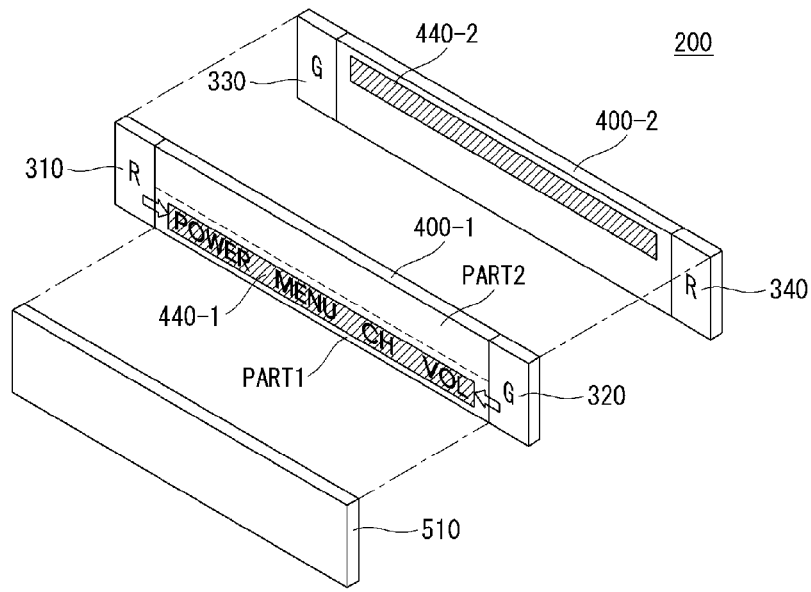
FIG. 10 illustrates another example of the input/output module of the electronic device according to the present invention.

FIG. 10 illustrates another example of the input/output module 200 of the electronic device 100 according to the present invention. It can be also seen that a pair of emitting layers are arranged on the different surfaces which are separated perpendicularly in the input/output module 200 illustrated in the 10.

Referring to FIG. 10, it can be seen that the input/output module 200 includes the first emitting layer which includes a touch sensing pad 510, the first light emitting device pair 310, 320, and the first light guiding passage 400-1, and the second emitting layer which is arranged under the first emitting layer and includes the second light emitting device pair 330, 340 and the second light guiding passage 400-2.

As described with reference to FIG. 9, the light emitted from the first light emitting device pair 310 of the first emitting layer of the input/output module 200 illustrated in FIG. 10 is guided through the light guiding passage 400-1, and part of the guided light can be provided to the user by passing through the light penetrating area 440-1 formed on the first part (PART 1). The first light guiding passage 400-1 is preferably transparent or translucent since the light passing through the light penetrating area 440-2 of the second emitting layer should be provided to the user. Also, at least the light penetrating area of the second light guiding passage 400-2 should be transparent or translucent.

The patterns representing the functions that can be controlled by the input/output module 200 is represented on the light penetrating area 440-1 of the first light guiding passage 400-1 of the first emitting layer of the input/output module 200 illustrated in FIG. 10. In this case, it is preferable that the patterns have different transmittance than the transmittance of the light penetrating area 440-1. The patterns can be represented by, for example, nontransparent material. In this way, the user can easily recognize the portion of patterns when light passes through the light penetrating area 440-1.

Figure 11:
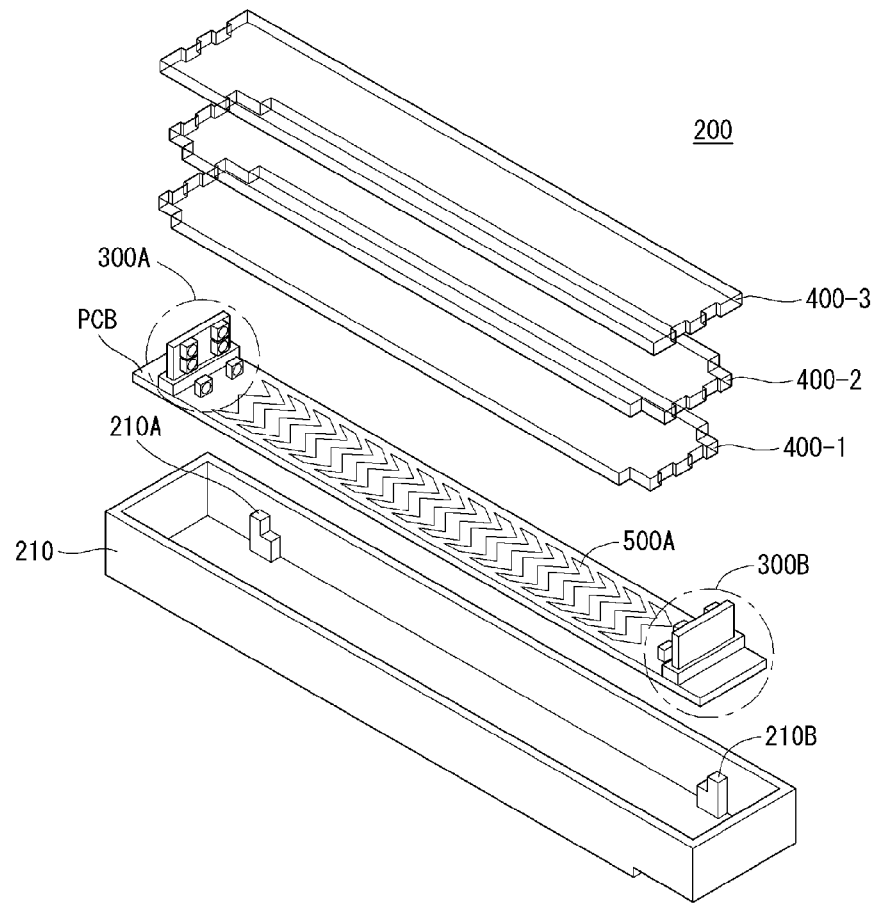
FIG. 11 is an exploded perspective view of the input/output module of the electronic device according to another embodiment of the present invention.

FIG. 11 is an exploded perspective view of the input/output module 200 of the electronic device 100 according to another embodiment of the present invention. In FIG. 11, the input/output module 200 illustrated in the figure represents input/output module 200 having multi-layer structure with three emitting layers laminated.

Referring to FIG. 11, the input/output module 200 includes a case 210, a PCB (Printed Circuit Board), a light emitting module 300A, 300B mounted on the PCB, a sensor pattern 500A mounted on the PCB, a light guiding module 400 including the first, second and third light guiding passage 400-1, 400-2, 400-3.

It can be seen that the case 210 includes bumps 210A, 210B which enable the second and third light guiding passages 400-2, 400-3 to be arranged at the level corresponding to the height of the light emitting device pair mounted on the PCB after the PCB has been installed on the case 210. Although not illustrated in the figure, additional bumps corresponding to the bumps 210A, 210B are formed on the inner surface of the case 210.

Although not specifically illustrated in the figure, the PCB can include various devices for driving the light emitting module 300A, 300B and wires connecting the light emitting module 300A, 300B and the various devices. The PCB can also include various devices for driving the sensor patterns 500A for detecting user's touch and wires connecting the sensor patterns 500A and the various devices.

The first light guiding passage 400-1 guides the light emitted from the two pairs of light emitting devices with the lowest heights of mounted PCBs among the light emitting devices included in the light emitting module 300A, 300B, the second light guiding passage 400-2 guides the light emitted from the two pairs of light emitting devices with the middle heights of mounted PCBs among the light emitting devices included in the light emitting module 300A, 300B, and the third light guiding passage 400-3 can guide the light emitted from the two pairs of light emitting devices with the highest heights of mounted PCBs among the light emitting devices included in the light emitting module 300A, 300B.

Also, it is preferable that at least the second and third light guiding passages 400-2, 400-3 of the first, second and third light guiding passages 400-1, 400-2, 400-3 are made of transparent or translucent material. The reason is that the light which has passed through the light penetrating area of the light guiding passage below the second and third light guiding passages 400-2, 400-3 should be provided to the user by penetrating the second and third light guiding passages 400-2, 400-3. It may be noted that light penetrating areas that can be formed on part of each of the first, second and third light guiding passages 400-1, 400-2, 400-3 are not illustrated in FIG. 11. Also at least the light penetrating area of the first light guiding passage 410 in the first light guiding passage 400-1 should be transparent or translucent.

Figure 12:
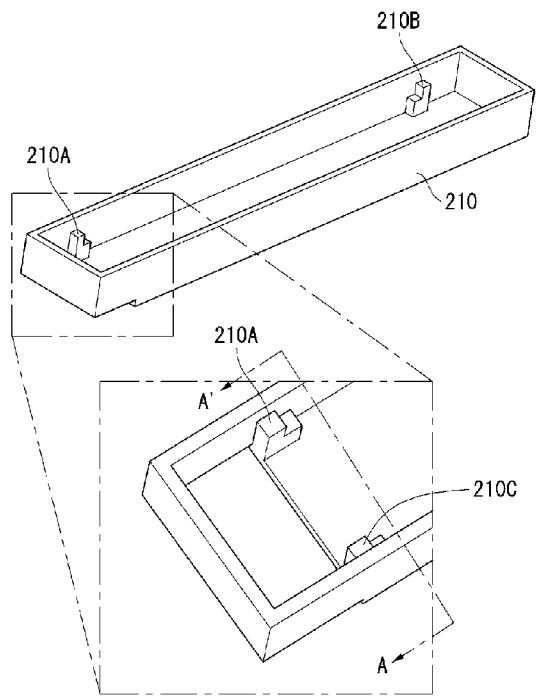
FIG. 12 is a detailed view of the input/output module illustrated in FIG. 11.

FIG. 12 is a detailed view of the case 210 of the input/output module 200 illustrated in FIG. 11. Referring to FIG. 12, it can be seen that the inner surface of the case 210 includes additional bumps 210B corresponding to the bumps illustrated in FIG. 11.

Figure 13:
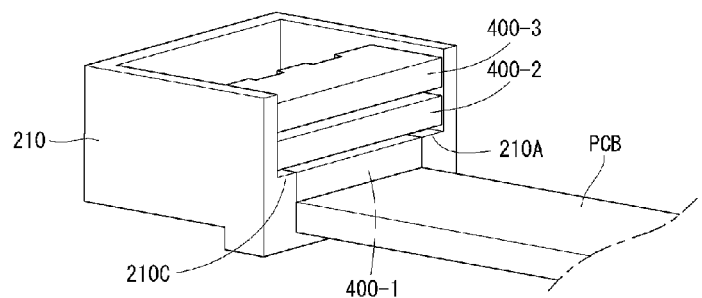
FIG. 13 illustrates the combined state of the input/output module illustrated in FIG. 11.

FIG. 13 illustrates the combined state of the input/output module 200 illustrated in FIG. 11. It may be noted that FIG. 13 shows the cross-sectional view of the input/output module 200 cut along the line A-A' of FIG. 12 in the state where the PCB and the light guiding module 400 are combined with the case 210.

Referring to FIG. 13, it can be seen that the first light guiding passage 400-1 is layered on the PCB, and the second light guiding passage 400-2 and the third light guiding passage 400-3 are arranged on the bumps 210A, 210C formed on the case 210 and sequentially layered on the first light guiding passage 400-1.

Figure 14:
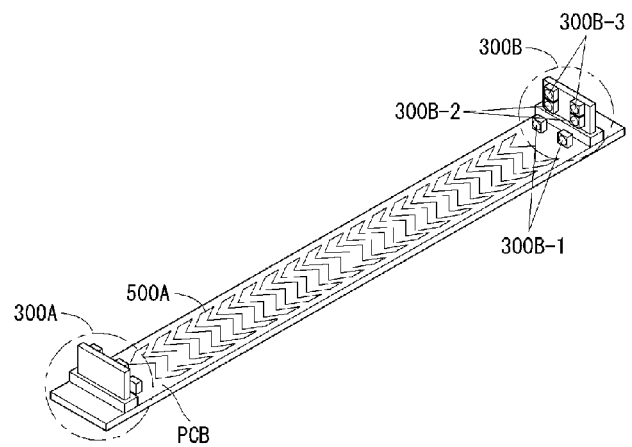
FIG. 14 is an enlarged view of the light emitting module and sensor pattern mounted on the PCB illustrated in FIG. 11.

FIG. 14 is an enlarged view of the light emitting module 310A, 310B and sensor pattern 500A mounted on the PCB illustrated in FIG. 11. Referring to FIG. 14, it can be seen that one side 300B of the light emitting module 300A, 300B mounted on the PCB includes a light emitting device pair 300B-1 which emits light to the first light guiding passage 400-1, a light emitting device pair 300B-2 which emits light to the second light guiding passage 400-2, and a light emitting device pair 300B-3 which emits light to the third light guiding passage 400-3. The other side 300A of the light emitting module 300A, 300B includes a light emitting device pair corresponding to the light emitting device pair.

Figure 15:
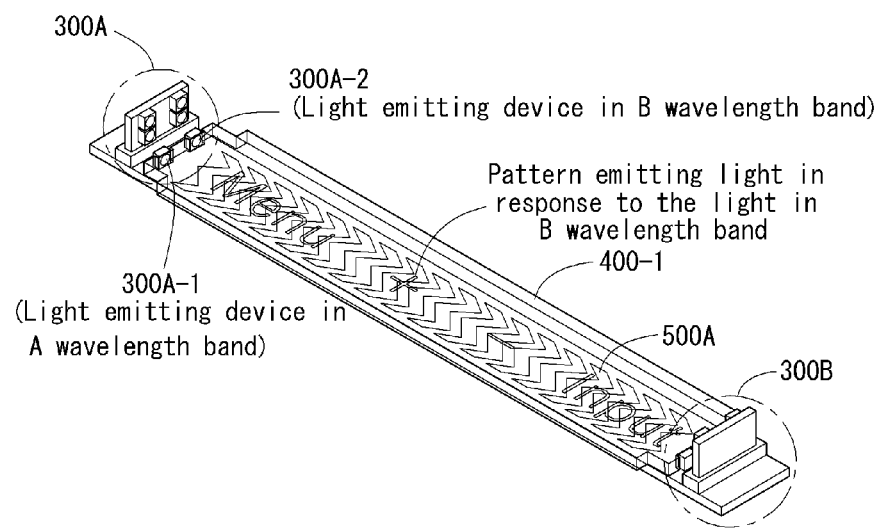
FIG. 15 illustrates that the first light guiding passage is combined to the PCB of the input/output module included in the electronic device according to the present invention.

FIG. 15 illustrates that the first light guiding passage 400-1 is combined to the PCB of the input/output module 200 included in the electronic device 100 according to the present invention. The light emitting device 300A-1 emitting A wavelength band and the light emitting device 300A-2 emitting B wavelength band emit lights to the first light guiding passage 400-1. In the first light guiding passage 400-1, patterns which are brightened in response to the light of B wavelength band are formed in the shape of characters (Menu, Input) or marks (+, −). When lights are emitted from the light emitting device 300A-2, the patterns can emit lights of a specific color in response to the light of B wavelength band.

Although not illustrated in FIG. 15, the first light guiding passage 400-1 can include light penetrating area through which parts of the lights of A and B wavelength bands emitted from the light emitting devices 300A-1, 300A-2 can pass. In this case, the light penetrating area can be formed by the fine patterns included in the first light guiding passage 400-1, in a similar way illustrated in FIG. 3 (d).

Figure 16:
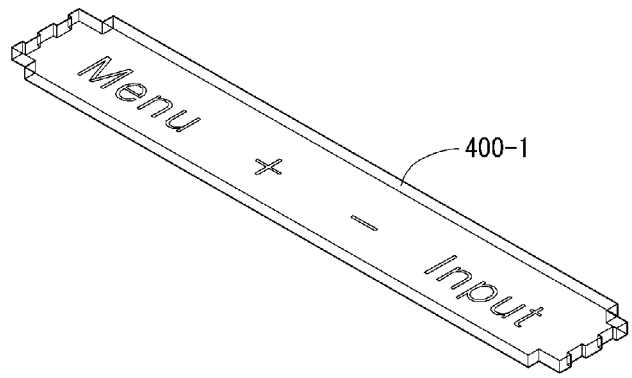
FIG. 16 illustrates the first light guiding passage shown in FIG. 15.

FIG. 16 illustrates the first light guiding passage 400-1 shown in FIG. 15. As described with reference to FIG. 15, the first light guiding passage 400-1 delivers information to a user through lighting patterns in response to the light of specific wavelength band emitted from the light emitting devices. On the other hand, the characters and marks shown in FIG. 16 can be implemented by the light penetrating areas which are brightened by the penetrating lights based on the scattered lights by the fine patterns included in the first light guiding passage 400-1.

Figure 17:
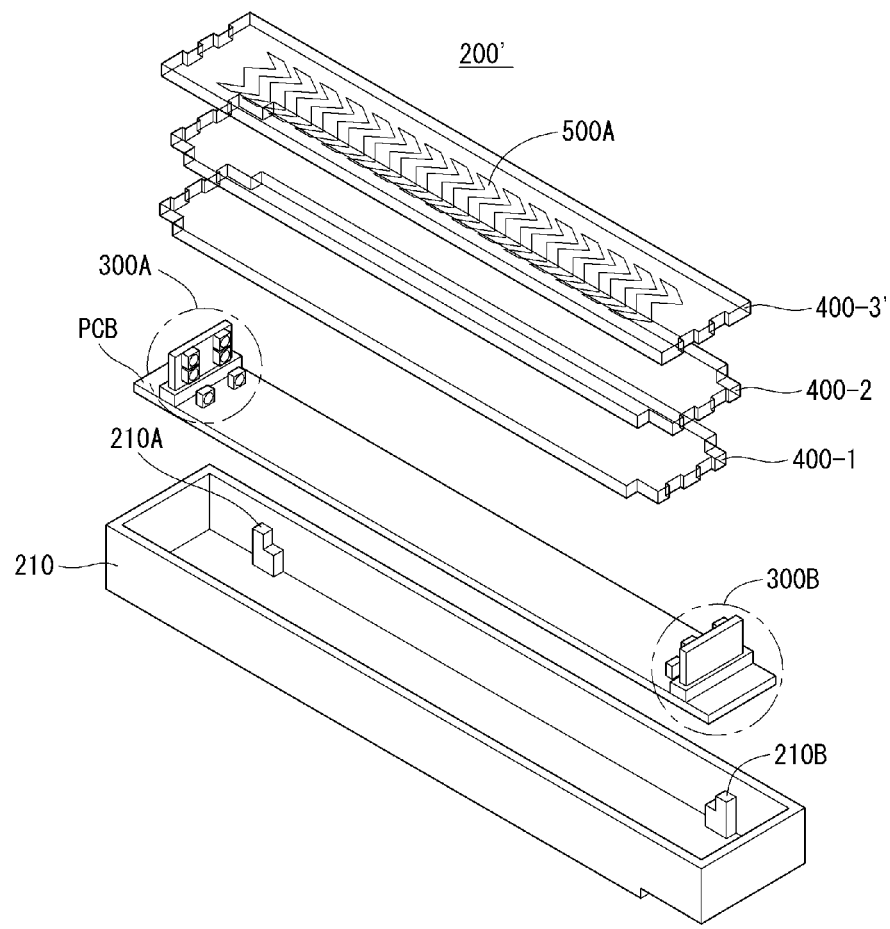
FIG. 17 is an exploded perspective view of the input/output module of the electronic device according to another embodiment of the present invention.

FIG. 17 is an exploded perspective view showing the input/output module 200 of the electronic device 100 according to another embodiment of the present invention the present invention. In the input/output module 200' illustrated in FIG. 17, sensor pattern 500A is formed on the third light guiding passage 400-3' rather than on the PCB of the second input/output module 230 as is the case with the input/output module 200' illustrated in FIG. 11. Other structures of the input/output module 200' illustrated in FIG. 17 except the location of the sensor pattern 500A is the same as the structure of the input/output module 200 illustrated in FIG. 11, and so detailed explanation of the input/output module 200' is omitted.

Figure 18:
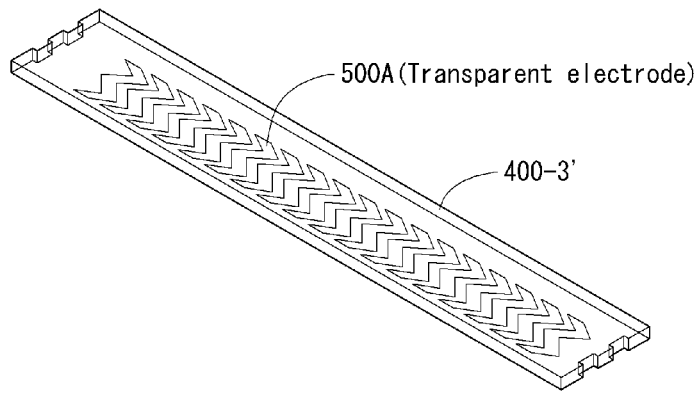
FIG. 18 is a detailed view of the third light guiding passage illustrated in FIG. 17.

FIG. 18 is a detailed view of the third light guiding passage 400-3 illustrated in FIG. 17. Referring to FIG. 18, it can be seen that the sensor pattern 500A formed on the third light guiding passage 400-3 is implemented by transparent electrode. The purpose of this structure is to minimize the effect on the light emitting operation of the input/output module 200.

Figure 19:
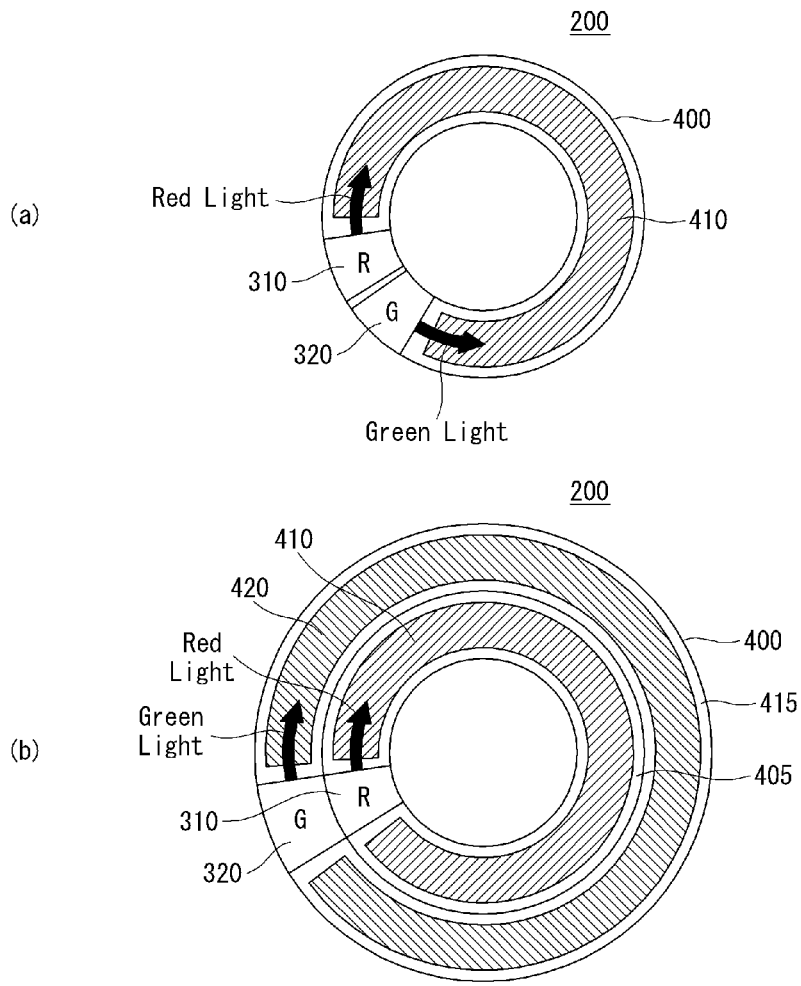
FIG. 19 illustrates another example of the input/output module included in the electronic device of the present invention.

FIG. 19 illustrates another example of the input/output module 200 included in the electronic device 100 of the present invention. The input/output modules 200 illustrated in FIG. 19 has circular type structure unlike the bar type described earlier.

The input/output module 200 illustrated in FIG. 19 (a) includes circular type light guiding module 400, it can be seen that the first and second light emitting modules 310, 320 emitting red light and green light in the opposite direction are arranged on parts of the light guiding module 400. The red and green lights emitted are guided through the light guiding module 400, and part of the lights are transmitted to the user by passing through the light penetrating area 410 of the light guiding module 400.

The input/output module 200 illustrated in FIG. 19 (b) is arranged on the same surface, and includes the first emitting layer including the first light emitting module 310 and the first light guiding passage 405 guiding the lights emitted from the first light emitting module 310, and the second emitting layer including the second light emitting module 320 and the second light guiding passage 415 guiding the lights emitted from the second light emitting module 320. Also, the first and second light guiding passages 405, 415 include light penetrating area 410, 420 respectively in order to provide the guided and penetrated light to the user, the light being emitted from the corresponding light emitting module of the first and second light emitting modules 310, 320.

Figure 20:
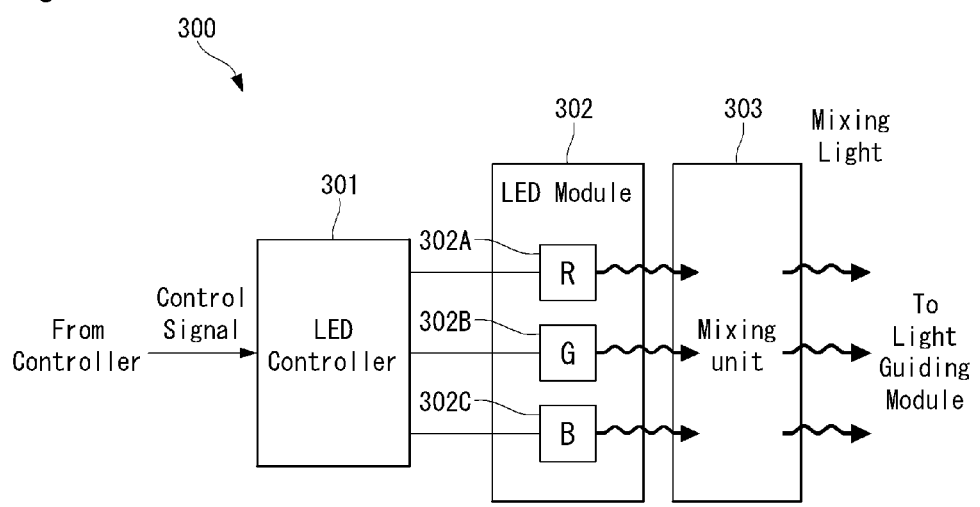
FIG. 20 illustrates one example of the light emitting module included in the input/output module included in the electronic device according to the present invention.

FIG. 20 illustrates one example of the light emitting module 300 included in the input/output module 200 included in the electronic device 100 according to the present invention. More specifically, the light emitting module 300 illustrated in FIG. 20 is one example of the light emitting module that can emit lights of various colors by using multiple single-color emitting diodes.

Referring to FIG. 20, the light emitting module 300 includes an emitting diode controller 301, an emitting diode module 302 and a mixing unit 303. The emitting diode controller 301 outputs drive signal for controlling the light emitting operation of the multiple emitting diodes 302A, 302B, 302C included in the emitting diode module 302 in response to the control signal received from the controller 120 of the electronic device 100. In this case, the control signal is generated based on specific information related to the operation of the electronic device 100, which is to be provided to the user through the input/output module 200.

The multiple emitting diodes 302A, 302B, 302C included in the emitting diode module 302 performs the light emitting operation in response to the drive signal of the drive signals which is output from the emitting diode controller 301. In this case, the intensity of the lights emitted from the multiple emitting diodes 302A, 302B, 302C can be different depending on the size of drive signal received.

The mixing unit 303 mixes the lights emitted from the emitting diode module 302, and outputs to the light guiding module 400 of the electronic device 100. In this step, the color and intensity of the lights emitted from the mixing unit 303 can be varied depending on the type and intensity of lights emitted from the emitting diode module 302.

Since the light emitting module 300 of FIG. 20 includes multiple emitting diodes 302A, 302B, 302C that can emit lights of three primary colors, red, green and blue, the types of information (i.e., the types of light color) that can be provided by the light emitting module 300 is greatly varied. In the other implementation of the present invention, however, the light emitting module 300 can include multi-color emitting diode that can emit lights of various colors, in which case the mixing means for mixing lights emitted from multiple emitting diodes may not be needed in the light emitting module 300.

Figure 21:
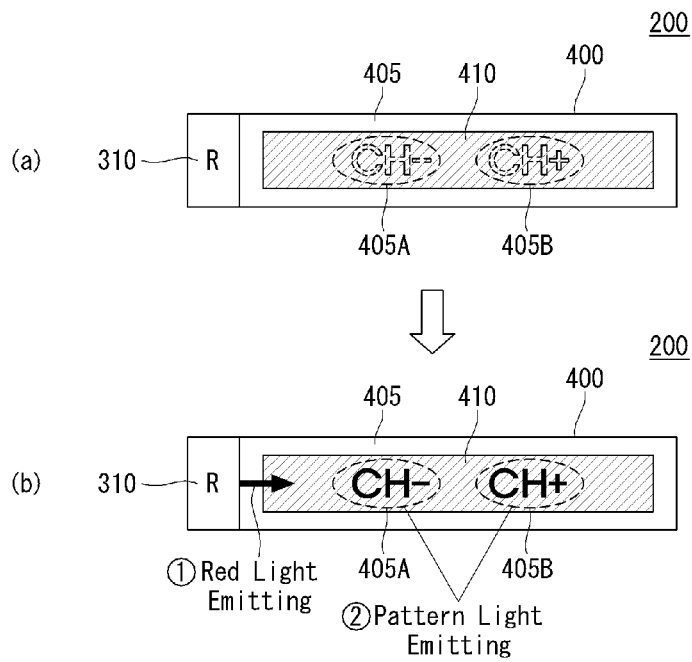
FIGS. 21, 22 and 23 illustrate other examples of the input/output module included in the electronic device according to the present invention.
Figure 22:
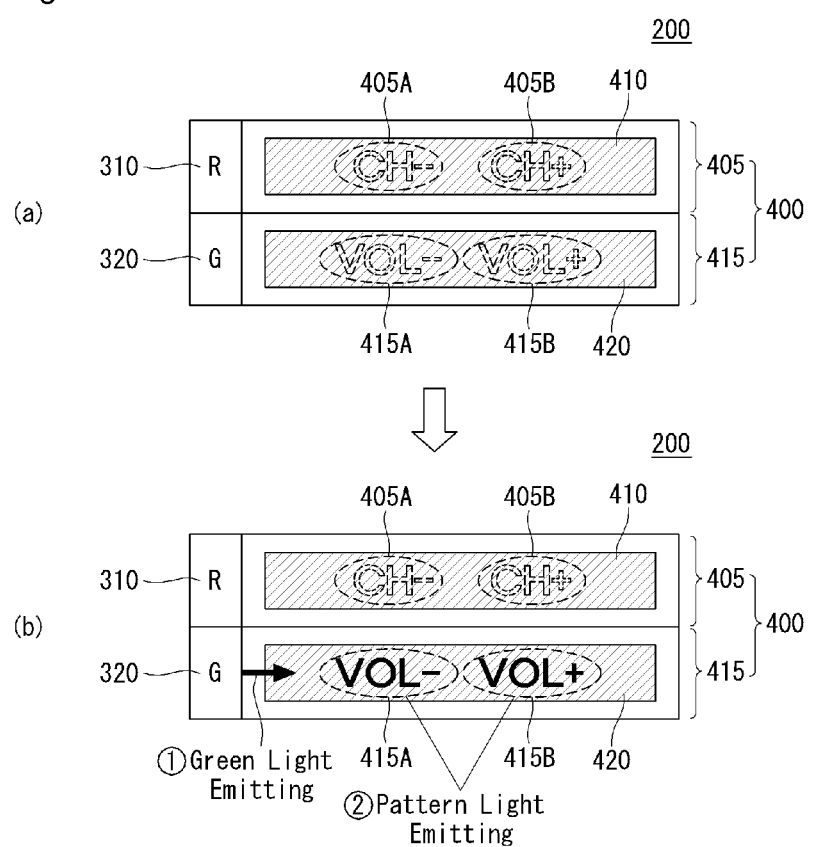
Figure 23:
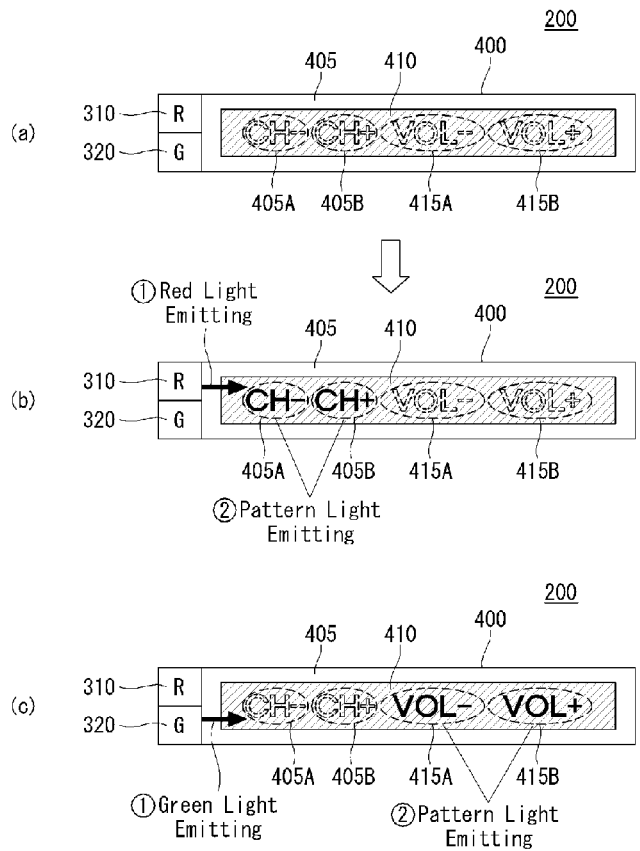

FIGS. 21, 22 and 23 illustrate other examples of the input/output module 200 included in the electronic device 100 according to the present invention. The input/output modules 200 illustrated in FIGS. 21, 22 and 23 include lighting patterns that are brightened in response to lights of specific wavelength band in the light penetrating area respectively.

Referring FIG. 21 (a), a light emitting module 310 emitting red light and a light guiding module 400 for guiding the light emitted from the light emitting module 310 are included. The light guiding module 400 includes the light guiding passage 405, and a light penetrating area 410 is prepared on parts of the light guiding passage 405. Also, the light penetrating area 410 includes an emitting pattern group 405A, 405B which has the features of emitting, in response to the lights emitted from the light emitting module 310, lights of different wavelength bands than those of the emitted lights.

In this step, the emitting pattern group 405A, 405B can be implemented by pigment layers which are transparent at normal state but, upon receiving the lights emitted from the light emitting module 310, emit lights of different wavelength bands than those of the emitted lights in response to the lights emitted from the light emitting module 310.

The emitting pattern group 405A, 405B is represented by dotted line in FIG. 21 (a), which means that the emitting pattern group 405A, 405B is transparent at normal state, which applies to all emitting patterns represented by dotted line in the specification.

Referring to FIG. 21 (b), when red light is emitted from the light emitting module 310, the emitting pattern groups 405A, 405B emit light of specific color in response to the red light. The emitting pattern group is represented by solid line in FIG. 21 (b), which means that the emitting pattern group 405A, 405B is emitting lights, which applies to all emitting patterns represented by solid line in the specification.

Although the touch sensing module 500 is not shown in the input/output module 200 illustrated in FIG. 21, the input/output module 200 is assumed to be equipped with the touch sensing module 500 in the description of controlling process by user's touch. This will be the same in the examples described below.

For example, if the user touches on the emitting pattern group 405A, 405B at the state of FIG. 21 (*b*), the controller 120 of the electronic device 100 generates control signal predetermined for the location of the touch, and can change the broadcast channel received by the electronic device 100.

Referring to FIG. 22 (*a*), it can be seen that the input/output module 200 illustrated in FIG. 22 further includes, compared to the input/output module 200 illustrated in FIG. 21, the light emitting module 320 emitting green light and the light guiding passage 415 guiding the green light. The light penetrating area 420 of the light guiding passage 415 includes emitting pattern group 415A, 415B which emits light of specific wavelength band in response to the green light.

Since the operation of the input/output module 200 related to the emitting patterns in response to red light has been described above, only the operation of the input/output module 200 related to the emitting patterns in response to green light will be described below with reference to FIG. 22.

Referring to FIG. 22 (*b*), when the light emitting module 320 emits green light, the emitting pattern group 415A, 415B emits light of specific color in response to the green light.

Although the touch sensing module 500 is not shown in the input/output module 200 illustrated in FIG. 22, the control process of the channel by user's touch will be described assuming that the input/output module 200 is equipped with a touch sensing module 500. When the user touches on the emitting pattern group 415A, 415B at the state of FIG. 22 (*b*), the controller 120 of the electronic device 100 generates control signal predetermined for the location of the touch, and can control the volume of the audio signal which is output from the electronic device 100 through audio output module 140.

It can be seen that the input/output module 200 illustrated in FIG. 23 (*a*), unlike the input/output modules 200 illustrated in FIGS. 21 and 22, has the structure of guiding the lights emitted from the two light emitting modules 310, 320 through the light guiding passage 405 of the light guiding module 400. Also, the light penetrating area 410 of the light guiding passage 405 includes the first emitting pattern group 405A, 405B responding to red light and the second emitting pattern group 415A, 415B responding to green light.

FIGS. 23 (*b*) and (*c*) illustrate the process of brightening the first emitting pattern group 405A, 405B in response to the red light emitted from the first light emitting module 310, and the process of brightening the second emitting pattern group 415A, 415B in response to the green light emitted from the second light emitting module 320, respectively. These lighting mechanism and control of electronic device 100 through touch are similar to those described with reference to FIGS. 21 and 22, and detailed explanation is omitted.

Figure 24:
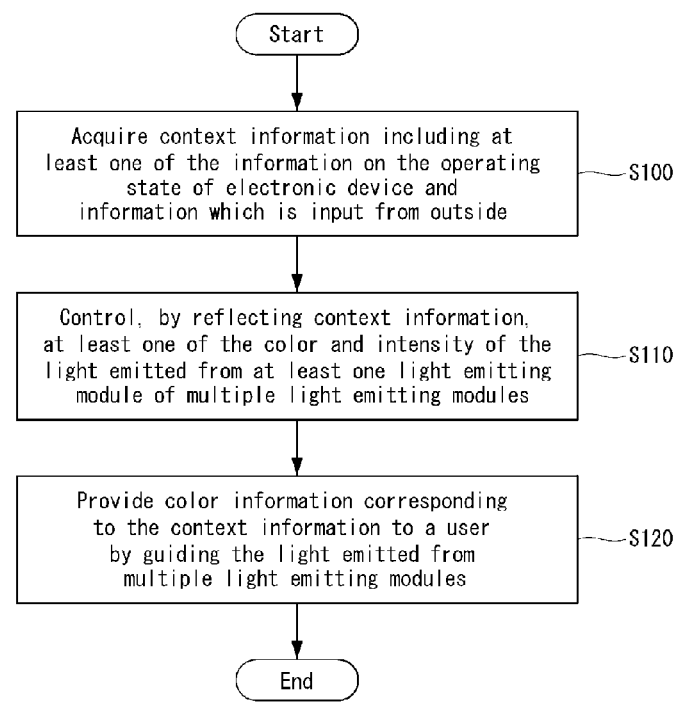
FIG. 24 is the flow diagram illustrating the method of providing information through the input/output module of the electronic device according to the present invention.

FIG. 24 is the flow diagram illustrating the method of providing information through the input/output module 200 of the electronic device 100 according to the present invention. The method of providing information will now be described with reference to relevant drawings.

The controller 120 of the electronic device 100 acquires at least one of the context information of the information on the operating state of the electronic device 100 and the information on the external input. (S100).

More description will be made on the context information, and then next processes of providing the information will be described. The information on the operating state of the electronic device 100 can include the physical state of the electronic device 100, default values related to specific functions of the electronic device 100, and features of contents stored in or output from the electronic device 100. The present invention, however, is not limited to this scope.

The physical state of the electronic device 100 can include at least one the physical state of the internal module included in the electronic device 100 or the external device (module) connected to the electronic device 100.

The physical state of the internal module included in the electronic device 100 can include connection state of the communication module 130 with external communication devices and communication speed with the external communication devices, and also the supply of power by the power supply module 160, the state of supplied power and power consumption. If the electronic device 100 is a printer, for example, the amount of ink in the ink supply module of the printer and the amount of papers in the paper feeding module can be included in the physical state of the internal module of the electronic device 100.

The physical state of the external devices connected to the electronic device 100 can include the information on whether the external device operates and the operation state of the external device, etc.

The default values related to specific functions of the electronic device 100 can include the volume of the audio signal output through the audio output module 140 of the electronic device 100, and brightness of the images output through the display device 110 of the electronic device 100. The features of contents stored in or output from the electronic device 100 can include the resolution of the image output through the display device 110, and the type of the images, etc.

The input received from external devices can include information related to direct touch or near field touch which is received through the touch sensing module 500. The information related to touch which is input through the touch sensing module 500 can include the location of touch, the number of touches, and the movement, intensity (area) and duration of the touch. Also the input information received from outside can include external images acquires through a camera (not illustrated).

Referring to FIG. 24 again, the controller 120, upon acquiring the context information, controls at least one of the color and intensities of the light emitted from at least one light emitting module of the multiple light emitting modules included in the light emitting module 300 by reflecting the context information acquired (S110).

Then, the light guiding module 400 guides the lights emitted from multiple light emitting modules including the at least one light emitting module through multiple light guiding passages, and parts of the lights emitted from the multiple light emitting modules are provided to the user by passing through the light penetrating areas included in the multiple light guiding passage (S120). The combination of the lights passing through each of the multiple light penetrating areas constitutes color information corresponding to the context information acquired.

Figure 25:
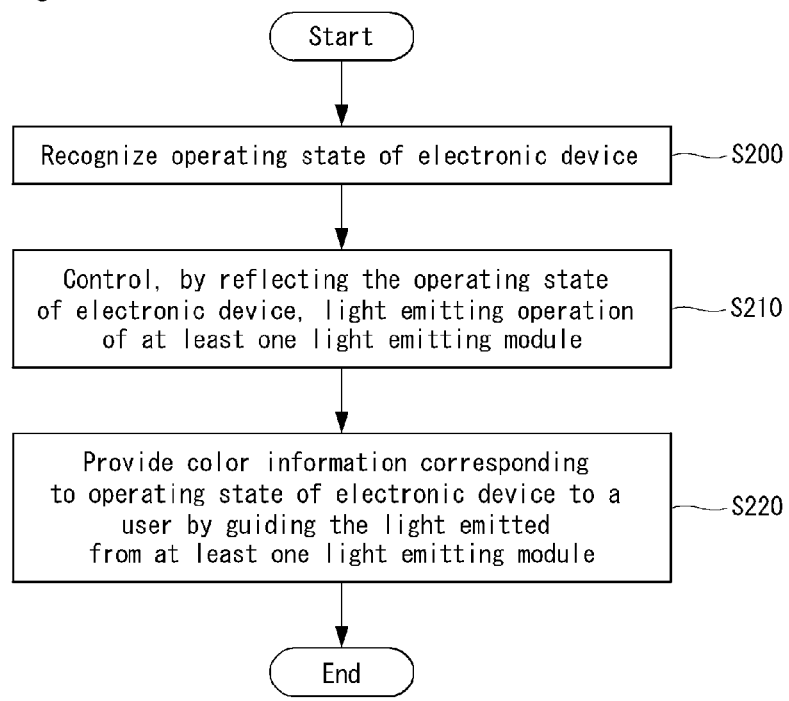
FIG. 25 is a flow diagram illustrating one example of the method of providing information through the input/output module of the electronic device illustrated in FIG. 24.

FIG. 25 is a flow diagram illustrating one example of the method of providing information through the input/output module 200 of the electronic device 100 illustrated in FIG. 24. The method of providing information will now be described with reference to relevant drawings.

The controller 120 of the electronic device 100 recognizes the operation state of the electronic device 100 (S200). When the operating state of the electronic device 100 is recognized, the controller 120 controls the operation of at least one light emitting module of the multiple light emitting modules included in the light emitting module 300 of the input/output module 200 by reflecting the operating state of the electronic device 100 (S210).

The light guiding module 400, under the control of the controller 120, guides the light emitted from at least one light emitting module, and provides color information corresponding to the operating state of the electronic device 100 to the user through the light penetrating area included in the light guiding module 400 (S220).

Figure 26:
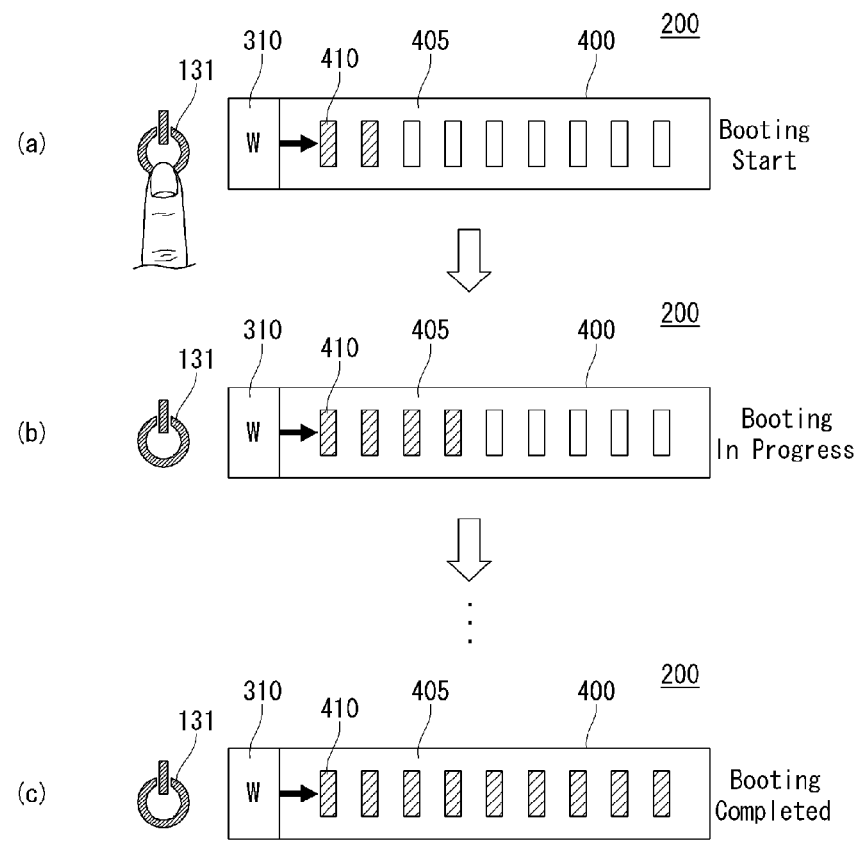
FIG. 26 illustrates an example of providing the booting process of the electronic device through the input/output module according to the method of providing information through the input/output module of the electronic device as illustrated in FIG. 25.

FIG. 26 illustrates an example of providing the booting process of the electronic device 100 through the input/output module 200 according to the method of providing information through the input/output module 200 of the electronic device 100 as illustrated in FIG. 25.

Referring to FIG. 26 (a), the user touches the portion of power button 131 of the electronic device 100. Then, the controller 120 starts the booting process of the electronic device 100, and controls the light emitting module 310 to emit light. The light emitted from the light emitting module 310 is guided through the light guiding passage 405 of the light guiding module 400, and part of the guided light is provided to the user through the light penetrating area 410 prepared on the light guiding passage 405.

Referring to FIGS. 26 (b) and (c), it can be seen that the controller 120 controls the light emitting module 310 reflecting the booting process so that the intensity of emitted light increases, and accordingly the progress of the booting process of the electronic device 100 is provided to the user through the light penetrating area 410.

Figure 27:
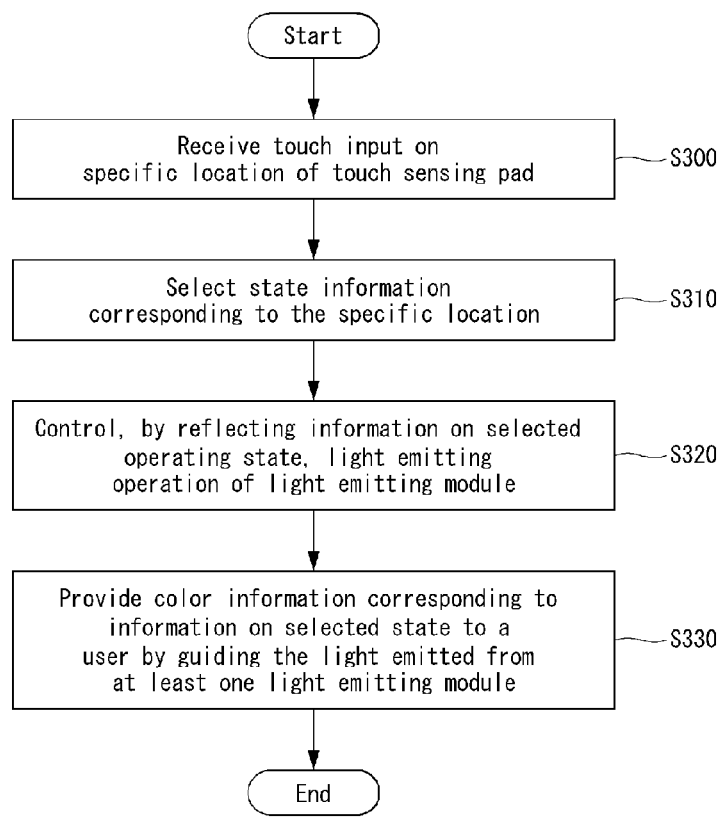
FIG. 27 is a flow diagram illustrating another example of providing information through the input/output module of the electronic device as illustrated in FIG. 24.

FIG. 27 is a flow diagram illustrating another example of providing information through the input/output module 200 of the electronic device 100 as illustrated in FIG. 24. The method of providing information will now be described with reference to the relevant drawings.

First, user's touch on specific location of the touch sensing module 500 is received (S300). Then, the controller 120 of the electronic device 100 selects state information corresponding to the specific location (S310), and controls the operation of emitting light of at least one light emitting module included in the light emitting module 300 by reflecting the selected information (S320).

When light is emitted from the light emitting module of at least one of the light emitting modules, under the control of the controller 120, the input/output module 200 의 light guiding module 400 provides the color information corresponding to the selected state information by guiding the light emitted from at least one light emitting module (S330). In this case, the color information corresponding to the selected state information is the part of the guided light shown to the user by passing through the light penetrating area included in the light guiding module 400.

Figure 28:
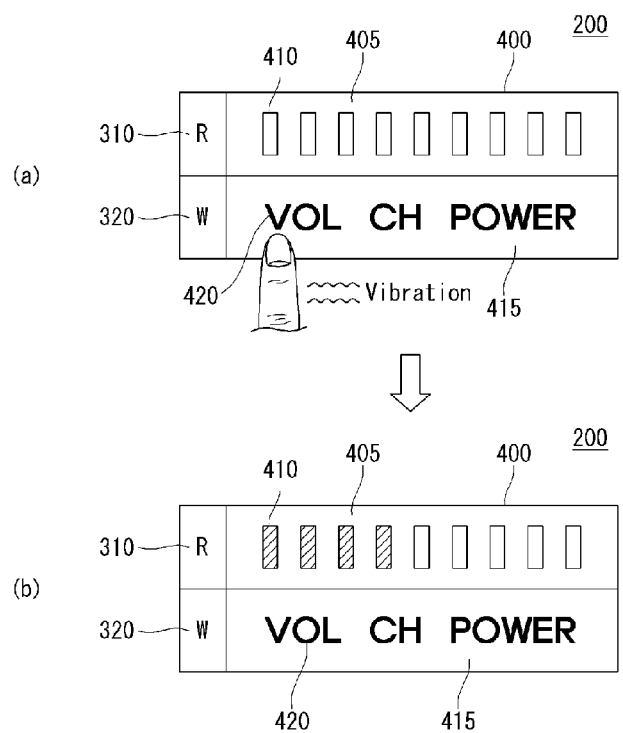
FIG. 28 illustrates an example of providing the information on the state of the electronic device through the input/output module according to the method of providing information through the input/output module of the electronic device as illustrated in FIG. 27.

FIG. 28 illustrates an example of providing the information on the state of the electronic device 100 through the input/output module 200 according to the method of providing information through the input/output module 200 of the electronic device 100 as illustrated in FIG. 27.

Referring to FIG. 28, the input/output module 200 includes a light guiding module 400 including the first and second light emitting modules 310, 320, and the first and second light guiding passage 405, 415. The first light emitting module 310 and the first light guiding passage 405 are used to provide operating state of the electronic device 100, and the second light emitting module 320 and the second light guiding passage 415 are used for a user to select the types of information. Although not illustrated in FIG. 28, the input/output module 200 further includes a touch sensing pad for receiving user's touch.

FIG. 28 (a) illustrates the process in which the second light emitting module 320 emits light, and the emitted light is provided to the user in the form of characters corresponding to the state information by penetrating the light penetrating area 420 of the second light guiding passage 415. The user touches the area corresponding to the volume of the audio signal which is output through the audio output module 140 of the light penetrating area 420 included in the second light guiding passage 415 at the state of FIG. 28 (a).

Then, the controller 120 of the electronic device 100 controls the light emitting operation of the first light emitting module 310 so that the light corresponding to the volume of the selected audio signal is provided to the user through the light penetrating area 410 of the first light guiding passage 405, as shown in FIG. 28 (b).

Meanwhile, the controller 120 can control the haptic module 150 so that vibration is generated when the light penetrating area corresponding to the volume of the audio signal is touched. Then, the user can recognize intuitively that color information corresponding to the volume of the audio signal will be provided by the user's touch. In this case, the intensity of vibration, the number of vibrations and the duration of vibration can be varied depending on the location where touch is received. Then, the user can recognize intuitively what type of operating state information he or she has requested.

Figure 29:
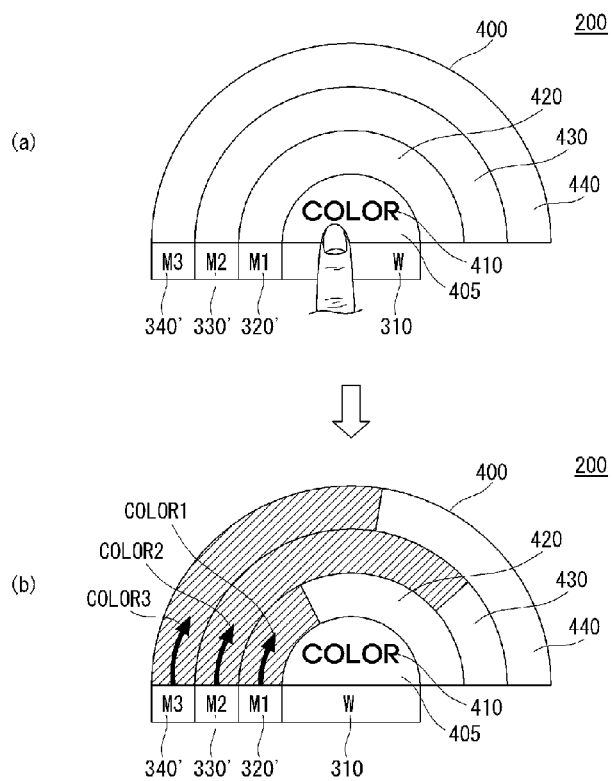
FIG. 29 illustrates another example in which the state information of the electronic device is provided through the input/output module according to the method of providing information through the input/output module of the electronic device illustrated in FIG. 27.

FIG. 29 illustrates another example in which the state information of the electronic device 100 is provided through the input/output module 200 according to the method of providing information through the input/output module 200 of the electronic device 100 illustrated in FIG. 27. The electronic device 100 is assumed to be a printer.

Referring to FIG. 29, the input/output module 200 includes the first through fourth light emitting modules 310, 320', 330', 340', and the first through fourth light guiding passages 405, 420, 430, 440 corresponding to the first through fourth light emitting modules 310, 320', 330', 340' respectively.

The first light emitting module 310 emits white light, and the first light guiding passage 405 guides the white light emitted from the first light emitting module 310, and parts of guided lights are provided to the user by penetrating the light penetrating area 410 prepared in the shape of characters 'COLOR' corresponding to the amount of the ink stored in the printer.

The second through fourth light emitting modules 320', 330', 340' include multi-color light emitting device which can emit light of color determined by the driving signal respectively. The light penetrating area is the whole region shown to the user in each of the second through fourth light guiding passage 420, 430, 440. Although not shown in FIG. 29, the input/output module 200 further includes the touch sensing pad for receiving user's touch.

The user touches the light penetrating area 410 included in the first light guiding passage 405 at the state of FIG. 29 (a). Then, the controller 120 of the electronic device 100 controls, as illustrated in FIG. 29 (b), the second light emitting module 320' so that the light of the color of the first ink (COLOR 1) installed on the electronic device 100 is emitted, controls the third light emitting module 330' so that the light of the color of the second ink (COLOR 2) installed on the electronic device 100 is emitted, and controls the fourth light emitting module 340' so that the light of the color of the third ink (COLOR 3) installed on the electronic device 100 is emitted. At this step, the amount of the lights emitted from the second through fourth light emitting module 320', 330', 340' is determined by the amount of corresponding ink.

The lights emitted from each of the second through fourth light emitting modules 310, 320', 330', 340' are guided through the second through fourth light guiding passages, and the guiding distance of the lights emitted from the second through fourth light emitting modules 310, 320', 330', 340' can be different depending on the amount of corresponding ink.

Figure 30:
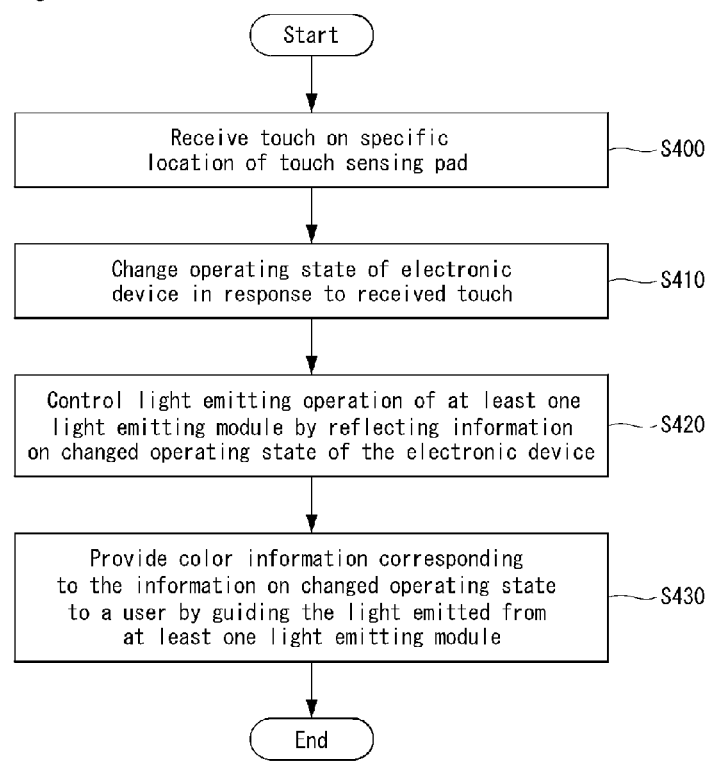
FIG. 30 is a flow diagram illustrating another example of the method of providing information through the input/output module of the electronic device shown in FIG. 24.

FIG. 30 is a flow diagram illustrating another example of the method of providing information through the input/output module 200 of the electronic device 100 shown in FIG. 24. The method of providing information will now be described with reference to relevant drawings.

Touch on the specific location of the touch sensing pad 510 of the touch sensing module 500 is received (S400). The controller 120 of the electronic device 100, upon receiving the touch, changes the operating state of the electronic device 100 in response to the touch received (S410). Then, the controller 120 controls the light emitting operation of at least one light emitting module of the multiple light emitting modules included in the light emitting module 300 by reflecting the information on the changed operating state of the electronic device 100 (S420).

Then, the light guiding module 400 of the input/output module 200 guides the lights emitted from at least one light emitting module so that the color information corresponding to the information on the changed operating state is provided to the user (S430). As described above, the color information corresponding to the information on the changed operating state means the part of the guided light which is provided to the user by penetrating the light penetrating area included in the light guiding module 400.

Figure 31:
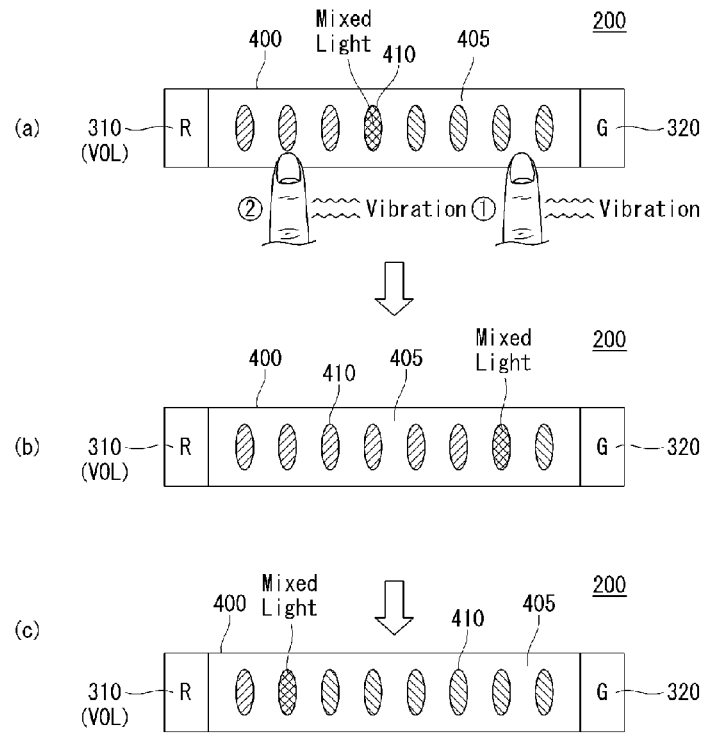
FIG. 31 illustrates one example in which the operating state of the electronic device according to the present invention is changed and the changed operating state is provided through the input/output module according to the method of providing information illustrated in FIG. 30.

FIG. 31 illustrates one example in which the operating state of the electronic device 100 according to the present invention is changed and the changed operating state is provided through the input/output module 200 according to the method of providing information illustrated in FIG. 30. More specifically, FIG. 31 illustrates the process in which the volume of the audio signal which is output through the audio output module 140 of the electronic device 100 is changed in response to user's touch, and the result of changed volume of the audio signal is provided through the input/output module 200.

Referring to FIG. 31 (*a*), it can be seen that the input/output module 200 includes the first and second light emitting modules 310, 320 reflecting the volume of the audio signal, and the light guiding module 400 which guides the lights emitted from the light emitting modules 310, 320 in the opposite direction. In the light guiding passage 405 of the light guiding module 400, a light penetrating area which is arranged with constant interval is prepared.

In FIG. 31 (*a*), the location of the light penetrating area through which the mixed light of the red light emitted from the first light emitting module 310 and green light emitted from the second light emitting module 320 penetrates corresponds to the volume value of the audio signal. At the state of FIG. 31 (*a*), the user touches right region of the light penetrating area through which the mixed light passes. Then, the controller 120 of the electronic device 100 controls, as shown in FIG. 31 (*b*), the light emitting operation of the first and second light emitting modules 310, 320 so that the location of the light penetrating area through which the mixed light passes moves to the right.

At the state of FIG. 31 (*b*), the user touches left region of the light penetrating area through which the mixed light passes. Then, the controller 120 controls, as shown in FIG. 31 (*c*), the light emitting operation of the first and second light emitting modules 310, 320 so that the location of the light penetrating area through which the mixed light passes moves to the left.

Meanwhile, as illustrated in FIG. 31 (*b*), the controller 120, upon receiving user's touch through the touch sensing module 500, can control the haptic module 150 to generate vibration. Then, the user can recognize intuitively that the volume of the audio signal will be changed by his or her touch.

Figure 32:
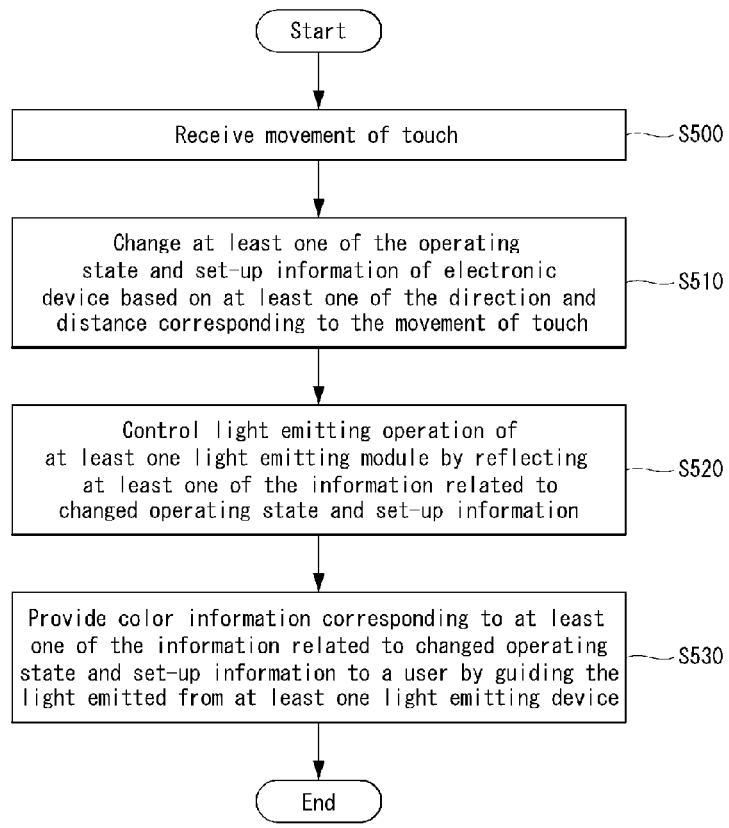
FIG. 32 is a flow diagram illustrating another example of the method of providing information through the input/output module of the electronic device illustrated in FIG. 24.

FIG. 32 is a flow diagram illustrating another example of the method of providing information through the input/output module 200 of the electronic device 100 illustrated in FIG. 24. The method of providing information will now be described with reference to relevant drawings.

User's touch is received through the touch sensing module 500 of the input/output module 200 (S500). Then, the user changes at least one of the operating state of the electronic device 100 and set-up information of the electronic device 100 based on at least one of the direction and distance of the movement of touch (S510).

Then, the controller 120 controls the light emitting operation of at least one light emitting module of the light emitting module 300 by reflecting at least one of the information related to changed operating state and the set-up information (S520). Then, the light guiding module 400 of the input/output module 200 guides the light emitted from at least one of the light emitting modules, and provides color information corresponding to at least one of the information related to changed operating state and the set-up information to the user (S530).

Figure 33:
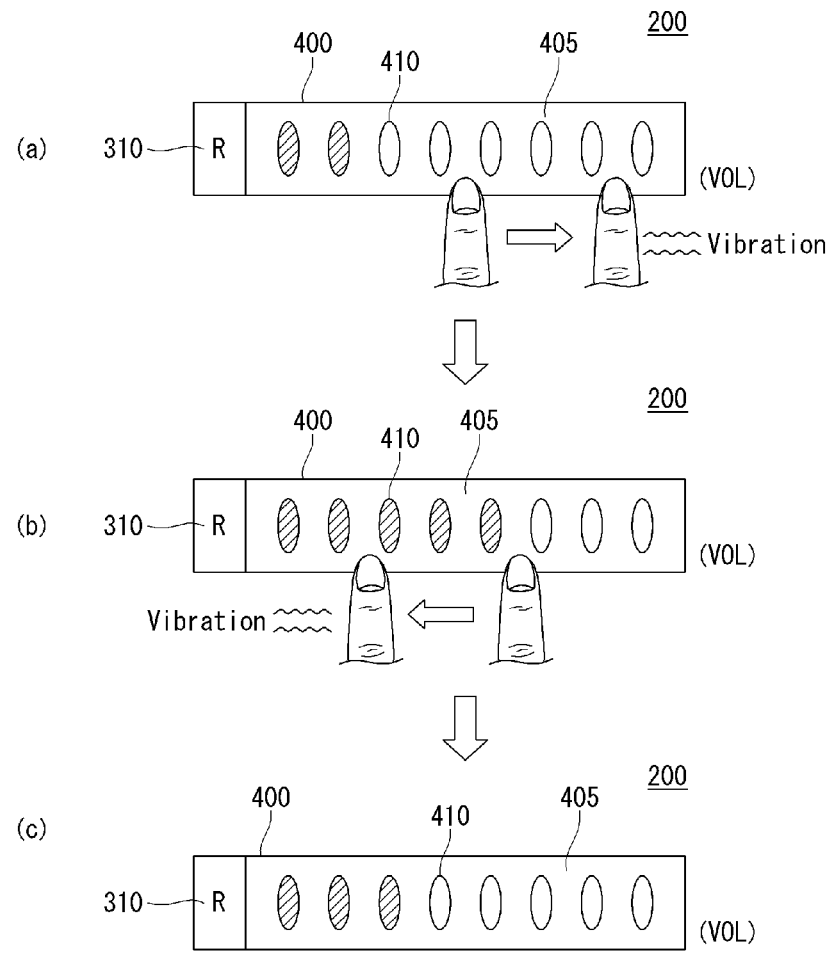
FIG. 33 illustrates one example in which the operating state of the electronic device according to the present invention is changed and the changed operating state is provided through the input/output module according to the method of providing information illustrated in FIG. 32.

FIG. 33 illustrates one example in which the operating state of the electronic device 100 according to the present invention is changed and the changed operating state is provided through the input/output module 200 according to the method of providing information illustrated in FIG. 32. More specifically, FIG. 33 illustrates the process in which the volume of the audio signal which is output from the audio output module 140 of the electronic device 100 is changed in response to user's touch, and the result of volume change of the audio signal is provided through the input/output module 200.

Referring to FIG. 33 (*a*), it can be seen that the input/output module 200 includes a light emitting module 310 emitting the light reflecting the volume of the audio signal, and a light guiding module 400 guiding the light emitted from the light emitting module 310. Light penetrating areas 410 are prepared on the light guiding passage 405 of the light guiding module 400 with constant intervals.

The guiding distance of the red light emitted from the light emitting module 310 in FIG. 33 (*a*) corresponds to the value of current volume of audio signal. At the state of FIG. 33 (*a*), the user moves the touch to the right. Then, the controller 120 of the electronic device 100 controls, as illustrated in FIG. 33 (*b*), the light emitting operation of the light emitting module 310 so that the guiding distance of the red light is increased by reflecting the moving distance of the touch.

Meanwhile, the haptic module 150 of the electronic device 100 can generate vibration according to the movement of the user's touch. The controller 120 of the electronic device 100 can control the haptic module 150 so that more strong vibration is generated as the moving distance of the touch increases. Then, the user can recognize through tactile sense that the audio signal which is output from the electronic device 100 increases by the user's touch.

At the state of FIG. 33 (*b*), the user moves the touch to the left. Then, the controller 120 can control, as illustrated in FIG. 33 (*c*), the electric signal provided to the light emitting module 310 so that the penetrating distance of the red light is decreased.

Meanwhile, the haptic module 150 of the electronic device 100 can control the haptic module 150 so that weaker vibration is generated as the user moves the touch. Then, the user can recognize through tactile sense that the volume of the audio signal which is output from the electronic device 100 is decreased by the touch of the user. It is shown in FIG. 33 that vibration intensity of the haptic module 150 can be controlled by the movement of the touch of the user. The controller 120, however, can also control the intensity of the vibration generated by the haptic module 150 by the location of the touch received through the touch sensing module 500.

Figure 34:
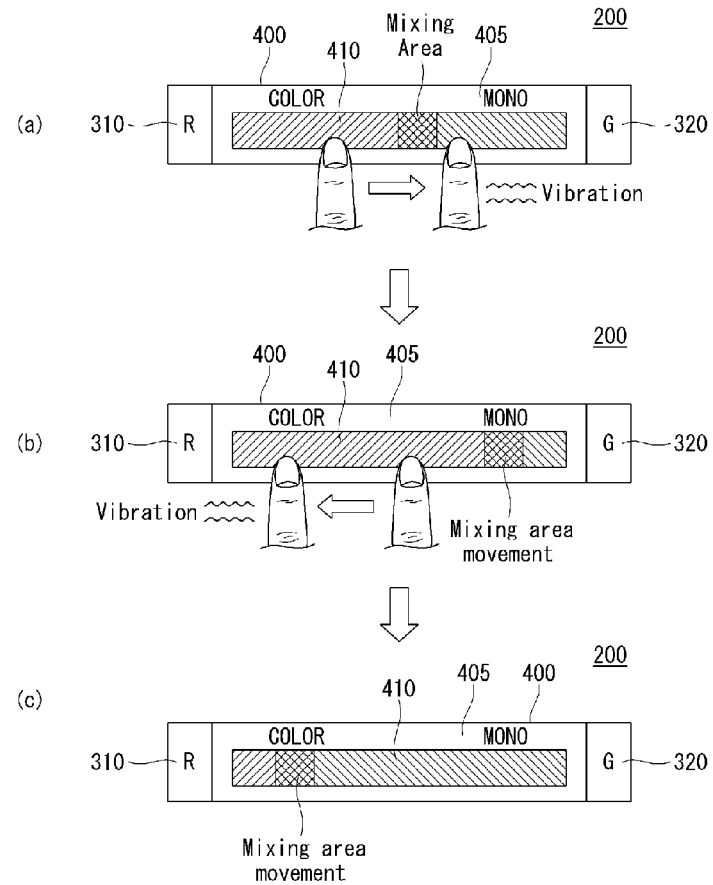
FIG. 34 illustrates one example in which the operating state of the electronic device according to the present invention is changed and the changed operating state is provided through the input/output module according to the method of providing information illustrated in FIG. 32.

FIG. 34 illustrates one example in which the operating state of the electronic device 100 according to the present invention is changed and the changed operating state is provided through the input/output module 200 according to the method of providing information illustrated in FIG. 32. More specifically, FIG. 34 illustrates that the printing mode of the electronic device 100, which is implemented through a printer, can be set or changed between color mode and black and white mode in response to the movement of user's touch.

Referring to FIG. 34 (a), it can be seen that the input/output module 200 includes the first and second light emitting modules 310, 320 and the light guiding module 400, and part of the light guiding module 400 includes the light penetrating area 410, and the light guiding module 400 guide the lights emitted from the first and second light emitting modules 310, 320 in the opposite direction.

At the state of FIG. 34 (a), the user moves the touch to the right while keeping the touch on the input/output module 200. Then, the controller 120 of the printer 100 sets the printing mode of the printer 100 to black and white mode. Then, the controller 120 controls, as illustrated in FIG. 34 (b), the light emitting operation of the first and second light emitting modules 310, 320 so that the mixing area of the lights emitted from the first and second light emitting modules 310, 320 moves to the right of the region where the pattern representing black and white mode is displayed.

The user moves the touch on the input/output module 200 from right to left at the state of FIG. 34 (b). Then, the controller 120 changes the printing mode from black and white mod to color mode. Then, the controller 120 controls, as illustrate in FIG. 34 (c), the light emitting operation of the first and second light emitting modules 310, 320 so that the mixing area of the lights emitted from the first and second light emitting modules 310, 320 moves to the left of the area where the pattern representing color mode is displayed.

Meanwhile, the haptic module 150 of the electronic device 100 can generate vibration according to the movement of user's touch. Then, the user can recognize through tactile sense that the printing mode of the printer 100 is changed by the user's touch. The controller 120 can also set the number and duration of vibrations of the haptic module 150 differently depending on the printing mode so that the user can recognize the printing mode intuitively through tactile sense. For example, the controller 120 can control the haptic module 150 to generate the first vibration when the printer 100 is in black and white mode, and generate the second vibration when the printer 100 is in color mode.

Figure 35:
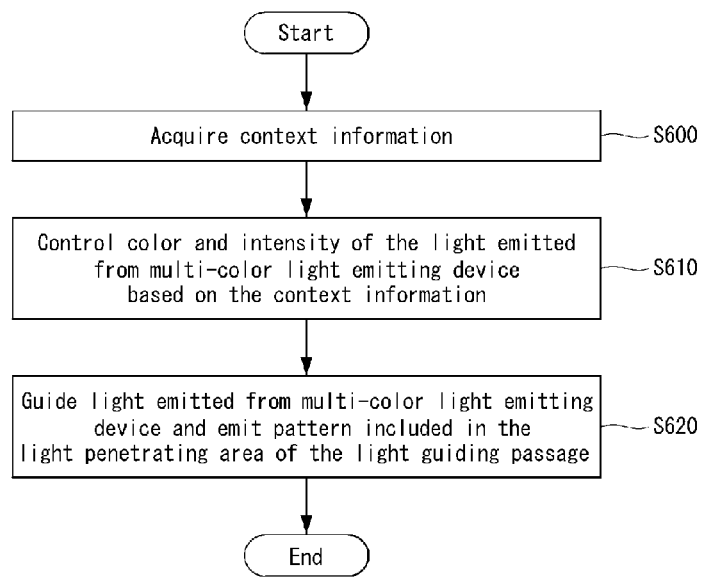
FIG. 35 is a flow diagram illustrating another example of providing information through the input/output module of the electronic device illustrated in FIG. 24.

FIG. 35 is a flow diagram illustrating another example of providing information through the input/output module 200 of the electronic device 100 illustrated in FIG. 24. The method of providing information will be described with reference to relevant drawings.

The controller 120 of the electronic device 100 acquires context information including at least one of the information related to the current operating state of the electronic device 100 and the information received from outside. (S600). Then, the controller 120 controls the color and intensity of the color emitted from the multi-color light emitting device included in the input/output module 200 according to the acquired context information (S610). Here, the color of the light emitted from the multi-color light emitting device can be varied depending on the types of the acquired context information, and the amount of the light emitted from the multi-color light emitting device can also be varied depending on the amounts represented by the acquired context information.

When light is emitted from the multi-color light emitting device, the light guiding module 400 of the input/output module 200 guides the light emitted from the multicolor light emitting device through the light guiding passage and provides color information corresponding to the acquired context information, and the pattern included in the light penetrating area of the light guiding passage emits light in response to the light emitted from the multi-color light emitting device (S620). In this case, the emitting pattern can be characters, marks, shapes or combination thereof representing the acquired context information.

Figure 36:
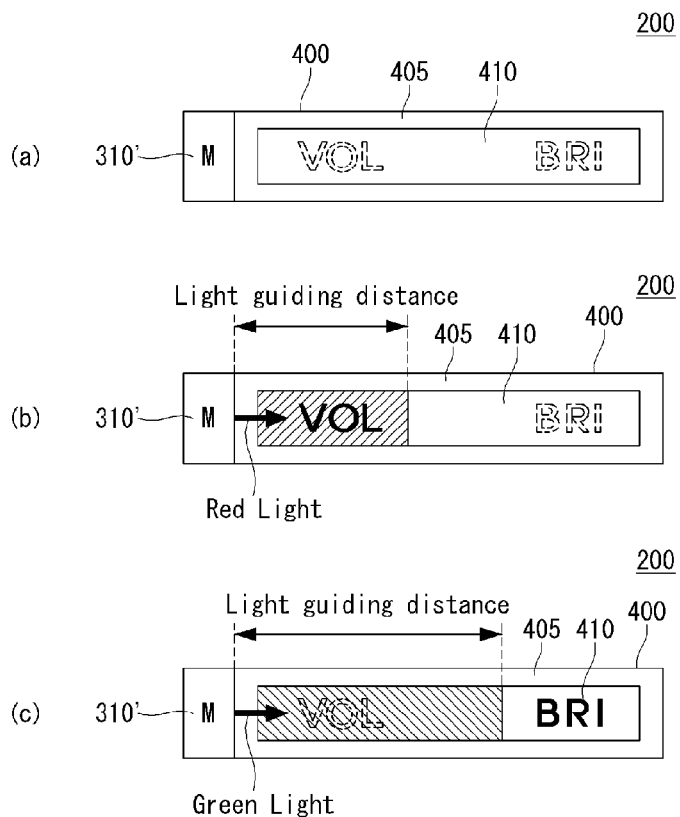
FIG. 36 illustrates an example in which the information related to the operating state of the electronic device according to the present invention is provided, according to the method of providing information illustrated in FIG. 35, to a user through the color and amount of the light emitted from the light emitting module, and the light emitted from the emitting pattern.

FIG. 36 illustrates an example in which the information related to the operating state of the electronic device 100 according to the present invention is provided, according to the method of providing information illustrated in FIG. 35, to a user through the color, amount of the light emitted from the light emitting module 310' and the light emitted from the emitting pattern.

Referring to FIG. 36 (a), the input/output module 200 includes a light emitting module 310' and a light guiding module 400. The light emitting module 310' can emit different colors of lights depending on the type of the information provided through the input/output module 200. The emitting pattern which is represented by dotted line in the light penetrating area 410 of the light guiding passage 405 of the light guiding module 400 emits light in response to specific wavelength band of lights emitted from the light emitting module 310'.

At the state of FIG. 36 (a), the light emitting module 310' emits red light which is allocated to the volume of the audio signal which is output from the electronic device 100. The red light emitted from the light emitting module 310' is guided through the light guiding passage 405. Then, as illustrated in FIG. 36 (b), the emitting pattern 'VOL' in the shape of characters corresponding to the audio signal among the emitting patterns displayed on the light guiding passage 405 emits light in response to the red light. At this step, the color of light emitted from the emitting pattern is preferably the color different from the red so that the user can easily recognize the emitting pattern which emits lights. Also, the guiding distance of the green light in the light penetrating area 410 corresponds to the volume of the audio signal.

At the state of FIG. 36 (a), the light emitting module 310' emits green light which is allocated to the brightness of the images which is output from the electronic device 100. The green light emitted from the light emitting module 310' is guided through the light guiding passage 405. Then, as illustrated in FIG. 36 (c), the emitting pattern 'BRI' in the shape of characters corresponding to the brightness of the images among the emitting patterns displayed on the light guiding passage 405 emits light in response to the green light. At this step, the color of light emitted from the emitting pattern is preferably the color different from the green so that the user can easily recognize the emitting pattern which emits lights. Also, the guiding distance of the green light in the light penetrating area 410 corresponds to the brightness of the images.

Figure 37:
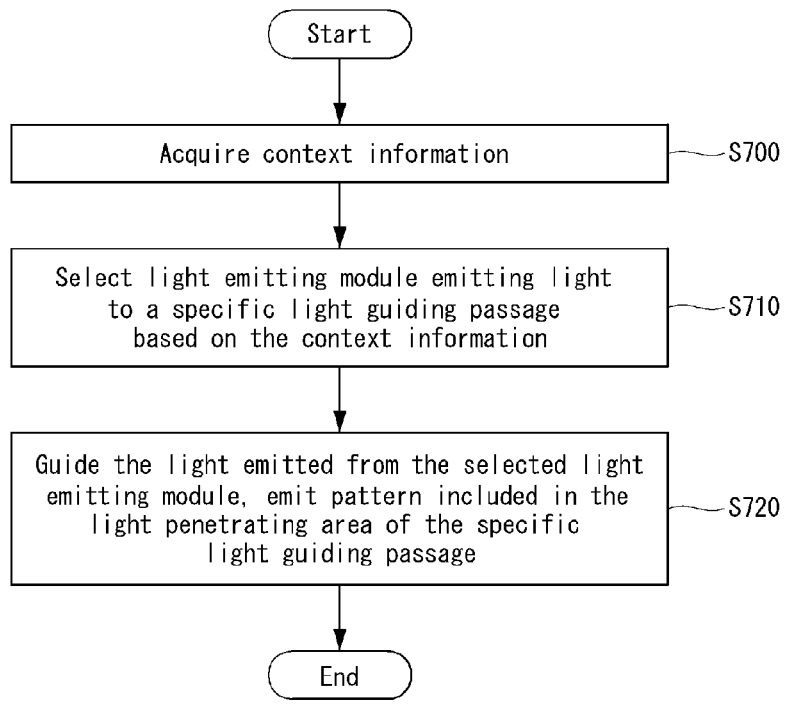
FIG. 37 is a flow diagram illustrating another example to provide information through the input/output module of the electronic device illustrated in FIG. 24.

FIG. 37 is a flow diagram illustrating another example to provide information through the input/output module 200 of the electronic device 100 illustrated in FIG. 24. The method of provide information will now be described with reference to relevant drawings.

The controller 120 of the electronic device 100 acquires context information including at least one of the information related to the current operating state of the electronic device 100 and the information received from outside. (S700). Then, the controller 120 selects a light emitting module which emits light to the specific light guiding passage of the light guiding module 400 based on the acquired context information (S710). At this step, the light emitting module which emits light to the specific light guiding passage can vary depending on the type of the acquired context information, and the amount of the light emitted from the light emitting module can vary depending on the amount represented by the acquired context information.

When light is emitted from the selected light emitting module, the specific light guiding passage guides the light emitted from the selected light emitting module and provides color information corresponding to the acquired context information to the user, and the pattern included in the light penetrating area of the light guiding passage emits light in response to the light emitted from the selected light emitting module (S720). In this case, the emitting pattern can be characters, marks, shapes or combination thereof representing the acquired context information.

Figure 38:
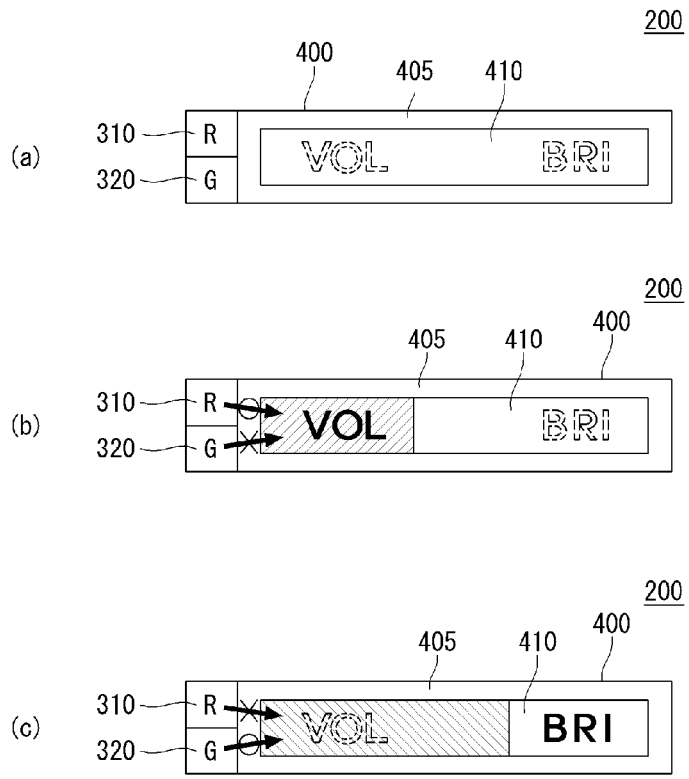
FIG. 38 illustrates an example in which, according to the method of providing information of the present invention as illustrated in FIG. 37, the information related to operating state of the electronic device according to the present invention is provided to the user through the color and amount of the light emitted from the light emitting modules and the light emitted from the emitting patterns.

FIG. 38 illustrates an example in which, according to the method of providing information of the present invention as illustrated in FIG. 37, the information related to operating state of the electronic device 100 according to the present invention is provided to the user through the color and amount of the light emitted from the light emitting modules 310, 320 and the light emitted from the emitting patterns.

Referring to FIG. 38 (*a*), the input/output module 200 includes the light emitting modules 310, 320 and the light guiding module 400. Each of the light emitting modules 310, 320 can emit red or green lights depending on the type of information provided through the input/output module 200. The emitting pattern, which is represented by dotted line in the light penetrating area 410 of the light guiding passage 405 of the light guiding module 400, emits light in response to the light of specific wavelength band emitted from the light emitting modules 310, 320.

At the state of FIG. 38 (*a*), red light is emitted from the light emitting device 310 allocated to the volume of the audio signal which is output from the electronic device 100. The red light emitted from the light emitting module 310 is guided through the light guiding passage 405. Then, as illustrated in FIG. 38 (*b*), the emitting pattern 'VOL' which is a character pattern corresponding to the audio signal of the emitting patterns displayed on the light guiding passage 410 emits light in response to the red light. At this step, the color of light emitted from the emitting pattern is preferably the color different from the red so that the user can easily recognize the emitting pattern which emits lights. Also, the guiding distance of the green light in the light penetrating area 410 corresponds to the volume of the audio signal.

At the state of FIG. 38 (*a*), the light emitting module 320 allocated to the brightness of the image signal which is output from the electronic device 100 emits green light. The green light emitted from the light emitting module 320 is guided through the light guiding passage 405.

Then, as illustrated in FIG. 38 (*c*), the emitting pattern 'BRI' in the shape of characters corresponding to the brightness of the emitting pattern displayed on the light penetrating area 410 of the light guiding passage 405 emits light in response to the green light. At this step, the color of light emitted from the emitting pattern is preferably the color different from the green so that the user can easily recognize the emitting pattern which emits lights. Also, the guiding distance of the green light in the light penetrating area 410 corresponds to the brightness of the image.

Figure 39:
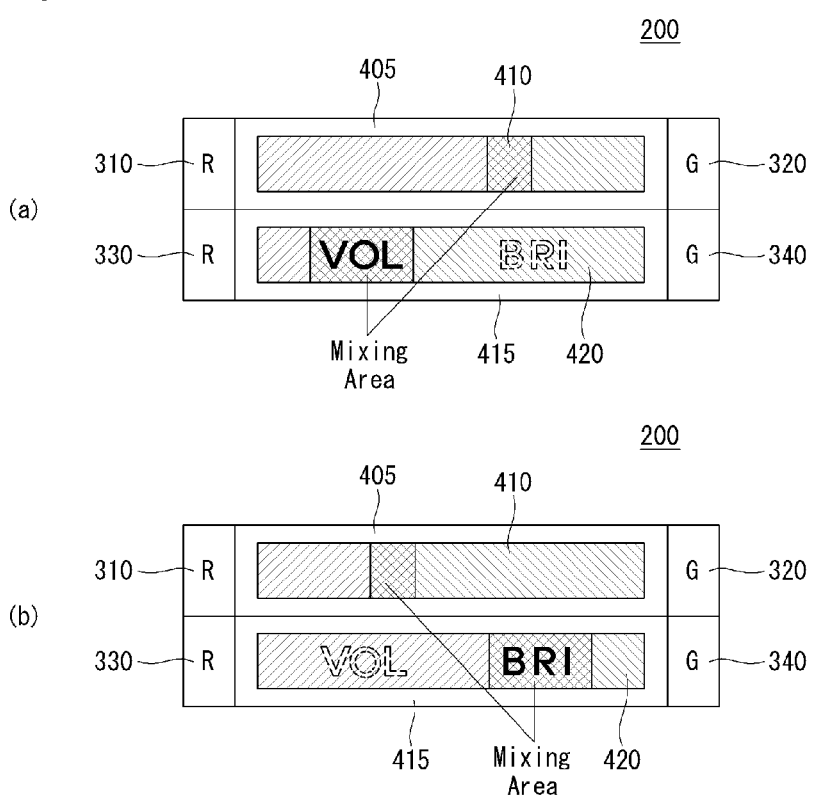
FIG. 39 illustrates another example in which, according to the method of providing information of the present invention as illustrated in FIG. 37, the information related to operating state of the electronic device according to the present invention is provided to the user through the color and amount of the light emitted from the light emitting modules and the light emitted from the emitting patterns.

FIG. 39 illustrates another example in which, according to the method of providing information of the present invention as illustrated in FIG. 37, the information related to operating state of the electronic device 100 according to the present invention is provided to the user through the color and amount of the light emitted from the light emitting modules 310, 320, 330, 340 and the light emitted from the emitting patterns.

The mixing area of the lights emitted from the first and second light emitting modules 310, 320 represents relative location of the value represented by the information provided to the user. The mixing area of lights emitted from the third and fourth light emitting modules 330, 340 is used to induce lighting of the emitting pattern designated in the light penetrating area 420 of the light guiding passage 415. In other words, the emitting pattern can emit lights in response to the lights of certain wavelength band generated in the mixing area.

For example, the user identifies the light emitted in the shape of characters from the emitting pattern, and can see that the information provided through the mixing area of the lights emitted from the first and second light emitting modules 310, 320 in FIG. 39 (*a*) is the volume of the audio signal, and that the information provided through the mixing area of the lights emitted from the first and second light emitting modules 310, 320 in FIG. 39 (*b*) is the brightness of the image signal.

Figure 40:
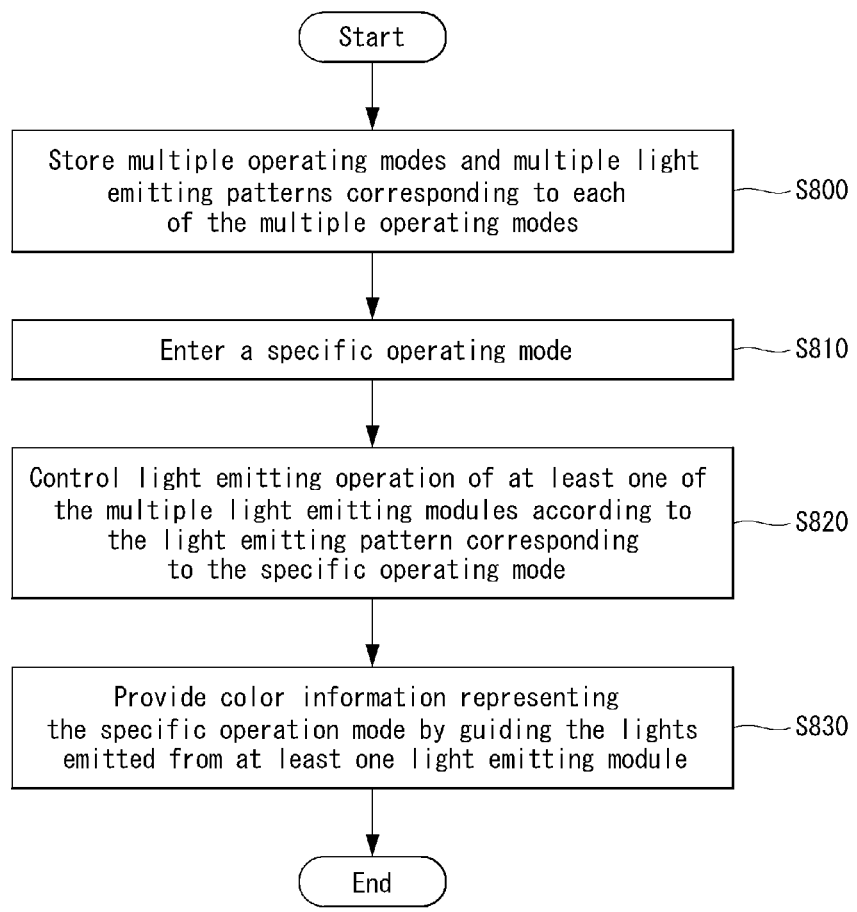
FIG. 40 is a flow diagram illustrating another example of providing information through the input/output module of the electronic device according to the present invention.

FIG. 40 is a flow diagram illustrating yet another example of providing information through the input/output module 200 of the electronic device 100 according to the present invention. The method of providing information will now be described with reference to relevant drawings.

Multiple operating states and multiple emitting patterns corresponding respectively to the multiple operating states are stored in the storing unit 170 of the electronic device 100 (S800). The electronic device 100 enters a specific operating mode of the multiple operating modes (S810). At this step, the operating modes of the electronic device 100 can include booting mode, wait mode, wait power save mode, cleaning mode, data receiving and transmitting mode, set up mode and mode for connection with external devices.

Then, the controller 120 of the electronic device 100 controls the light emitting operation of at least one light emitting module of the multiple light emitting modules included in the input/output module 200 according to the emitting pattern corresponding to the specific operating mode (S820). In this case, control of the light emitting operation of the light emitting module means controlling at least one of the color and intensity of the light emitted from the light emitting module.

The light guiding module 400 of the input/output module 200 can provide color information representing the specific operating mode to the user by guiding the light emitted from at least one of the light emitting modules (S830). More specifically, the color information provided to the user means the color information provided to the user by the part of the guided light which penetrates the light penetrating area included in the light guiding module 400.

Figure 41:
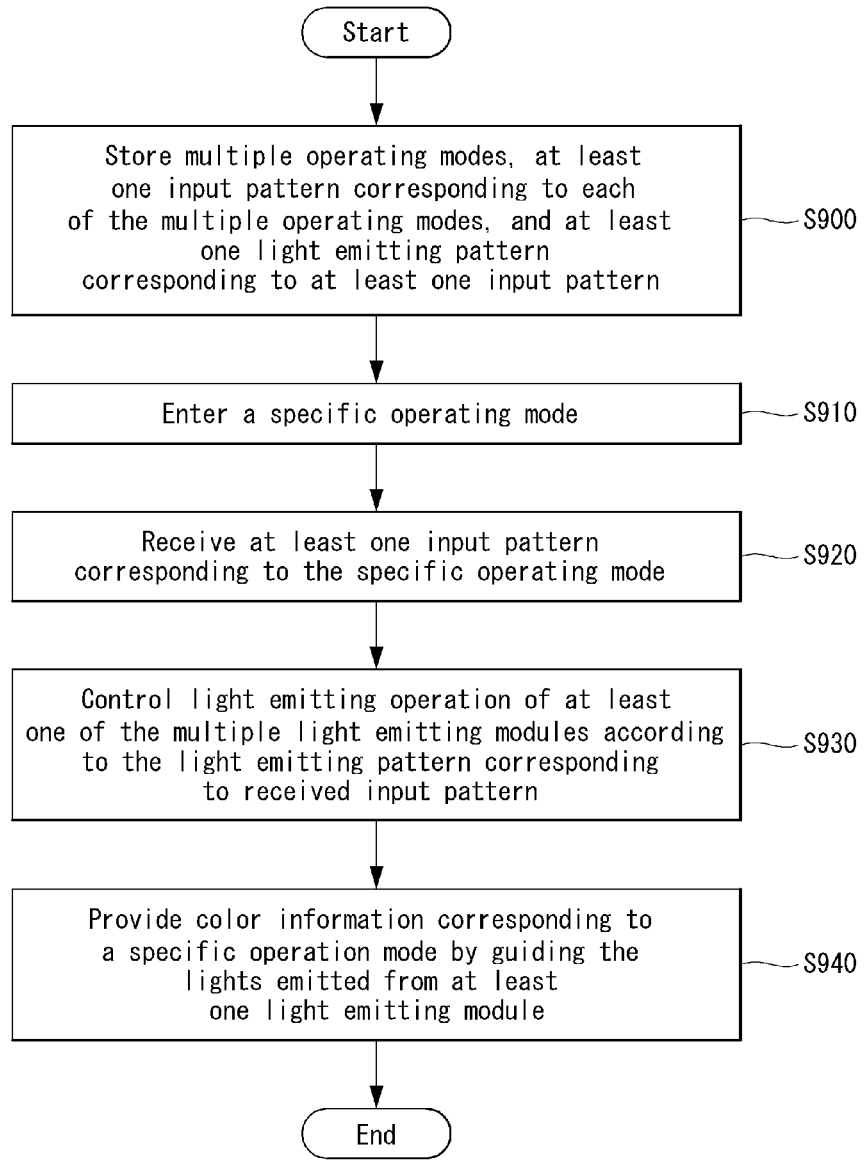
FIG. 41 is a flow diagram illustrating yet another example of providing information through the input/output module of the electronic device according to the present invention.

FIG. 41 is a flow diagram illustrating another example of providing information through the input/output module 200 of the electronic device 100 according to the present invention. The method of providing information will now be described with reference to relevant drawings.

Multiple operating states, at least one input pattern corresponding respectively to the multiple operating states and at least one emitting pattern corresponding respectively to the at least one input pattern are stored in the storing unit 170 of the electronic device 100 (S900). Here, the at least one input pattern can be a touch pattern which is input through the touch on the touch sensing module 500 of the input/output module

200. However, the scope of the present invention is not limited to these patterns. For example, the at least one input pattern can be received through a touch sensing module or input button which is separated from the input/output module 200.

In the state where the electronic device 100 has entered the specific operation mode of the multiple operation modes (S910), at least one input pattern corresponding to the specific operation mode is received through input means (S920).

Then, the controller 120 of the electronic device 100 controls light emitting operation of at least one light emitting module of the multiple light emitting modules included in the input/output module 200 based on the emitting pattern corresponding to the received input pattern (S930).

The light guiding module 400 of the input/output module 200 can provide color information related to the specific operating mode by guiding the light emitted from at least one of the light emitting modules (S940).

Figure 42:
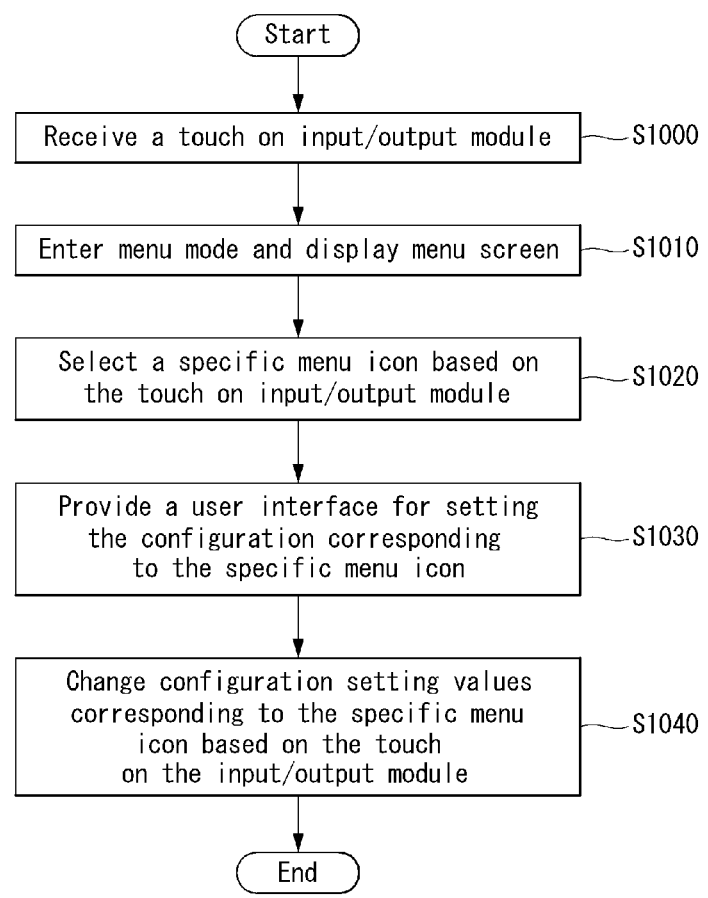
FIG. 42 is a flow diagram illustrating the method of setting the configuration in the electronic device according to the present invention based on the touch on the input/output module.

FIG. 42 is a flow diagram illustrating the method of setting the configuration in the electronic device 100 according to the present invention based on the touch on the input/output module 200. The method of setting the configuration will be described below referring to relevant drawings.

First, touch on the input/output module 200 is received (S1000). Then, the controller 120 of the electronic device 100 lets the electronic device 100 enter a menu mode, and displays the menu screen on the display device 110 (S1010). Then, the controller 120, upon receiving a touch on the clear area of the input/output module 200, disables the menu mode and stops displaying the menu screen. At this step, the clear area means the area of the electronic device 100 which is allocated to disable specific functions which have been activated.

Figure 43:
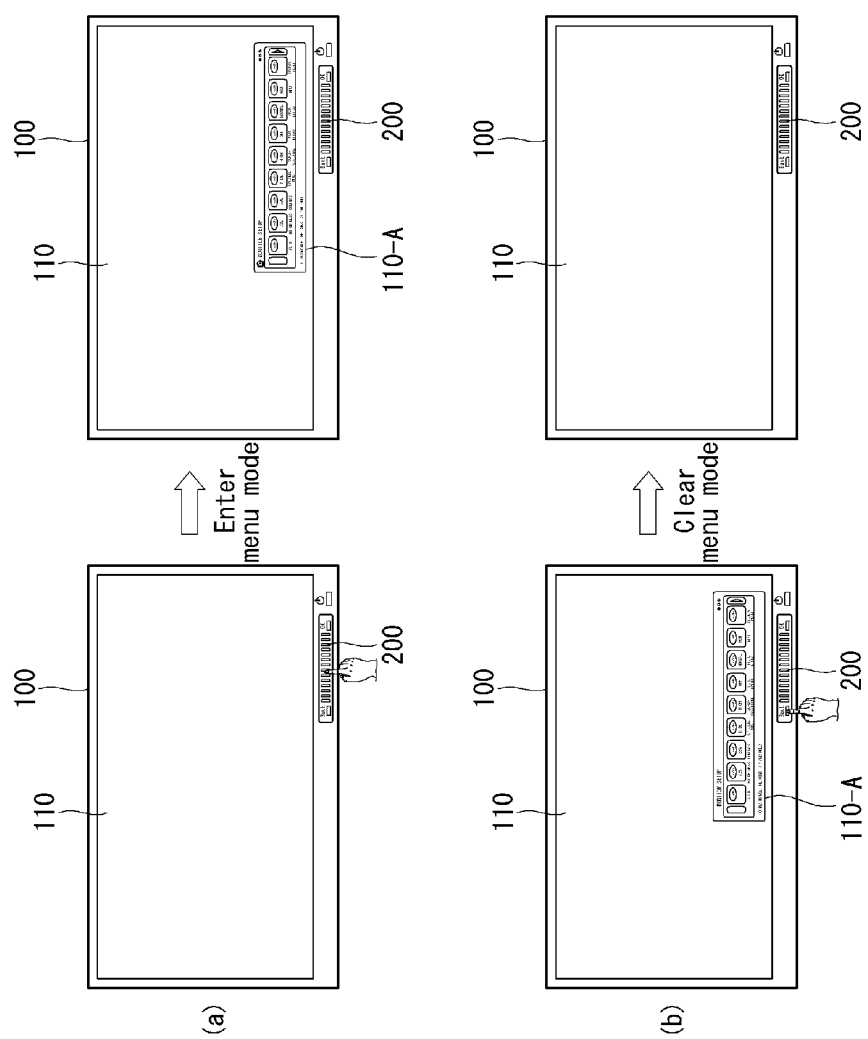
FIG. 43 illustrates the process of entering and clearing menu mode of the electronic device of the present invention based on the touch on the input/output module.

FIG. 43 illustrates the process of entering and clearing menu mode of the electronic device of the present invention based on the touch on the input/output module. Referring to FIG. 43 (*a*), it can be seen that the controller 120, when a user touches on the input/output module 200, displays the menu screen on the display device 110. Also, referring to FIG. 43 (*b*), when the user touches on the clear area of the input/output module 200, the controller 120 disables the menu mode and stops displaying of the menu screen.

Figure 44:
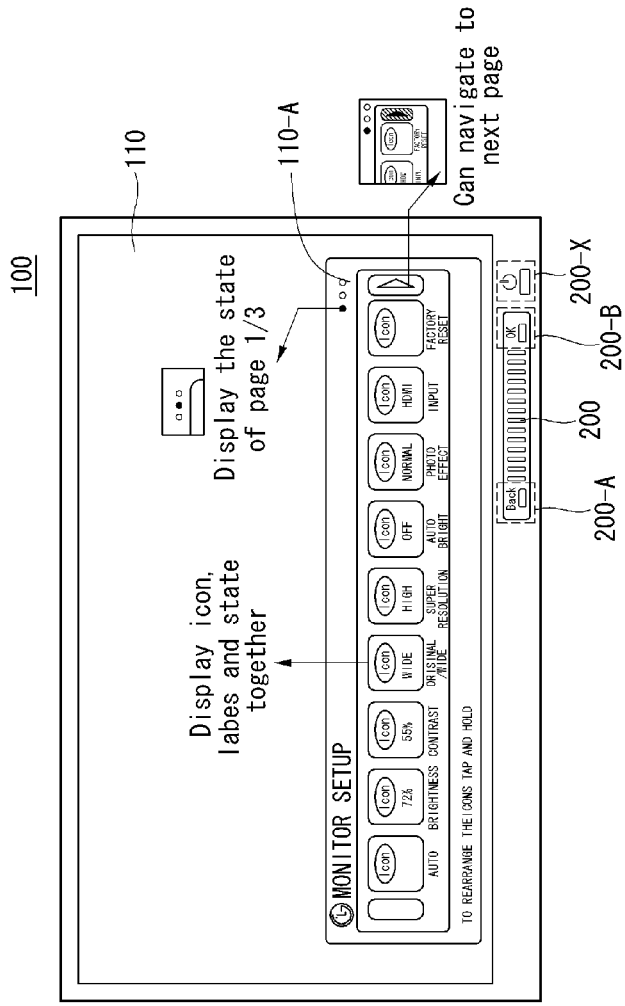
FIG. 44 is an enlarged view of the electronic device of the present invention which is in menu mode illustrated in FIG. 43.

FIG. 44 is an enlarged view of the electronic device 100 of the present invention which is in menu mode illustrated in FIG. 43. Referring to FIG. 44, it can be seen that multiple menu icons, character labels corresponding to the multiple menu icons respectively, and the state of configuration setting on the multiple menu icons are displayed on the menu screen 100-A.

As illustrated in FIG. 44, the menu screen can be composed of multiple pages. In FIG. 44, the menu screen is composed of 3 pages, and currently page 1 of 3 pages is displayed on the display device 110. The page can be navigated to next page through a touch on the arrow displayed on the right of the menu.

A button and the input/output module 200 are arranged in the bezel surrounding the display device 110 of the electronic device 100. The input/output module 200 includes the clear area 200-A and a input area 200-B for inputting options on the operating state and configuration set-up value of the electronic device 100.

Referring FIG. 42 again, the controller 120, upon receiving a touch on the input/output module 200, selects a specific menu icon included in the menu screen based on the received touch (S1020). Then, the controller 120 provides a user with a user interface corresponding to the specific menu icon for setting the configuration through the display device 110 (S1030).

At this step, the touch received can include one-time touch on the area corresponding to the specific menu icon in the input/output module 200. Also, the touch received can include a movement of a touch from the area that does not correspond to the specific menu icon to the area that corresponds to the specific menu icon in the input/output module 200. Also, the specific menu icon can be selected considering the direction and movement of the touch at the location of the cursor of the menu screen in the input/output module 200.

And then, the controller 120, upon receiving a touch on the input/output module 200, can change the set-up value of the configuration corresponding to the specific menu icon based on the touch received (S1040). At this step, the touch received can be a touch on a specific area in the input/output module 200 corresponding to the changed set-up value of the configuration, or movement of the touch to the specific area in the input/output module 200. Also, the set-up value of the configuration can be changed from the set-up value of the configuration before receiving the touch considering the direction and movement of the touch on the input/output module 200.

Although not illustrated in the figure, the controller 120 can control the color and intensity of the light emitted from at least one light emitting module included in the input/output module 200 considering the changed set-up value of the configuration. Then, the input/output module 200 can provide the user with color information corresponding to the changed set-up value of the configuration based on the lights emitted from one or more of light emitting modules or combination thereof.

Figure 45:
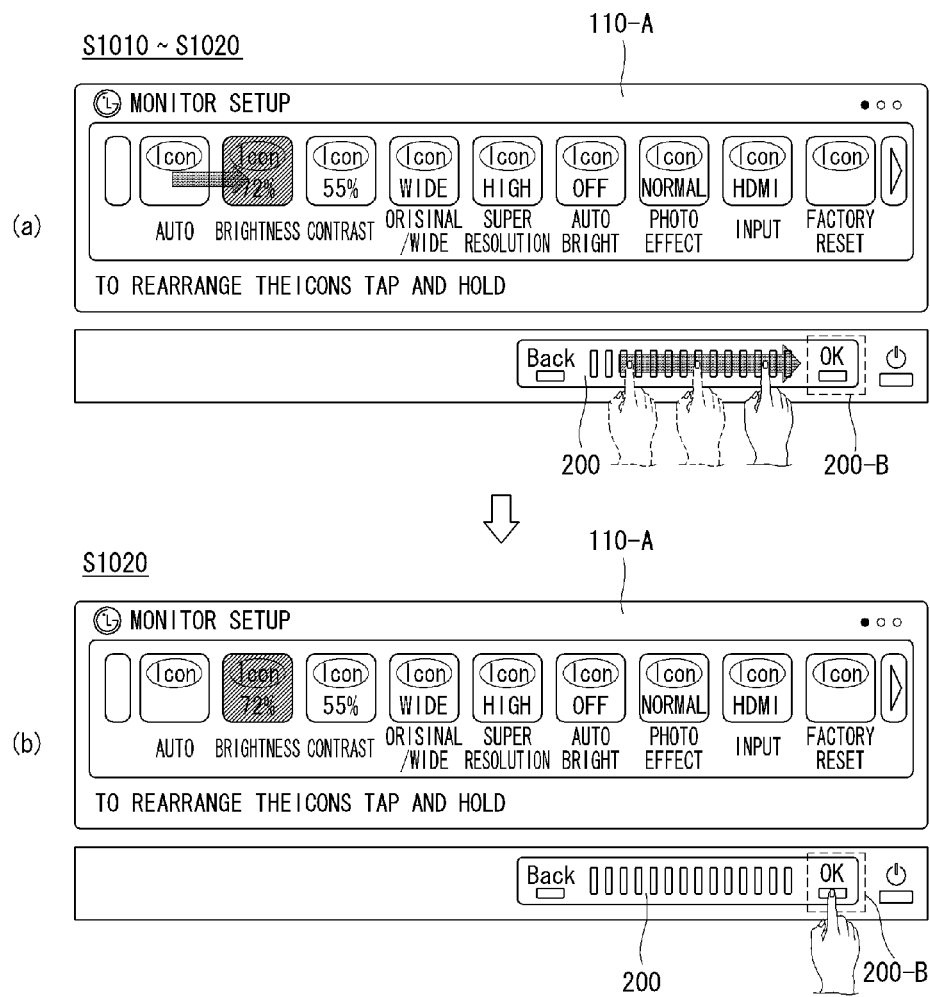
FIGS. 45 and 46 illustrate the process of setting the brightness value of the display device of the electronic device of the present invention according to the method of setting configuration illustrated in FIG. 42.
Figure 46:
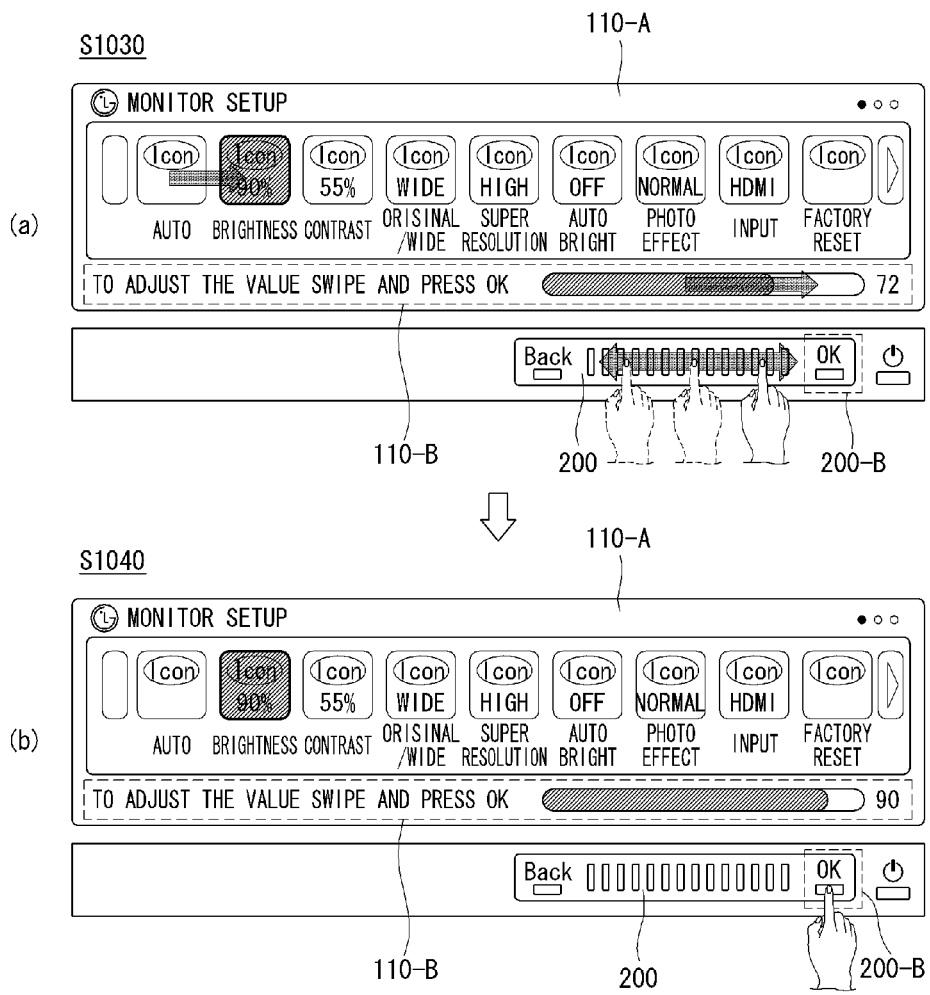

FIGS. 45 and 46 illustrate the process of setting the brightness value of the display device 110 of the electronic device 100 of the present invention according to the method of setting configuration illustrated in FIG. 42. The process of setting the brightness value will now be described with reference to relevant drawings.

The user can move the cursor on the menu screen 100-A by moving the touch on the input/output module 200 while the menu screen 100-A is displayed. Referring to FIG. 45 (*a*), it can be seen that the user moves the location of the cursor on the menu screen 100-A to the icon for setting the value of brightness by moving the touch on the input/output module 200. This step corresponds to the steps S1010 through S1020 in FIG. 42.

FIG. 45 (*b*) illustrates user's touch on the confirmation area of the input/output module 200 after the cursor in the menu screen 100-A has moved to the icon. Then, the controller 120, as illustrated in FIG. 46 (*a*), displays the user interface 110-B for setting brightness of the display device 110 on the display device 110. This step corresponds to the step S1030 in FIG. 42.

Referring to FIG. 45 (*a*), it can be seen that the value of 72, which is the currently set brightness of the display device 110, is displayed in the user interface 110-B. Also, icons other than the menu icon for setting the brightness of the display device 110, and corresponding areas are shown to be dimmed so that the user can intuitively recognize that the menu icon for setting the brightness of the display device 110 has been correctly selected by the user.

The user can change, as illustrated in FIG. 46 (*a*), the brightness value of the display device 110 by moving the touch on the input/output module 200. FIG. 46 (*b*) represents that the brightness value of the display device 110 has been increased to 90 as the user moves the touch on the input/output module 200 in FIG. 46 (*a*).

In the state of FIG. 46 (*b*), the user touches on the confirmation area. Then, the controller 120 can set the brightness value of the display device 110 to 90 by changing the value. This step corresponds to S1040 of FIG. 42. Meanwhile, changed brightness value can be stored in the storing unit 170 of the electronic device 100.

Unlike the description made with reference to FIGS. 42-46, the controller 120 may not display, on the display device 110, the user interface for setting the configuration corresponding to the specific menu icon selected even when the specific menu icon displayed on the menu screen 100-A has been selected. For example, when the user selects the icon for resetting the state of the electronic device 100 included in the menu screen 100-A to the state of factory default (FACTORY RESET), the controller 120 may note display additional user interface on the display device 110 while internally performing the operation of resetting the electronic device 100.

Figure 47:
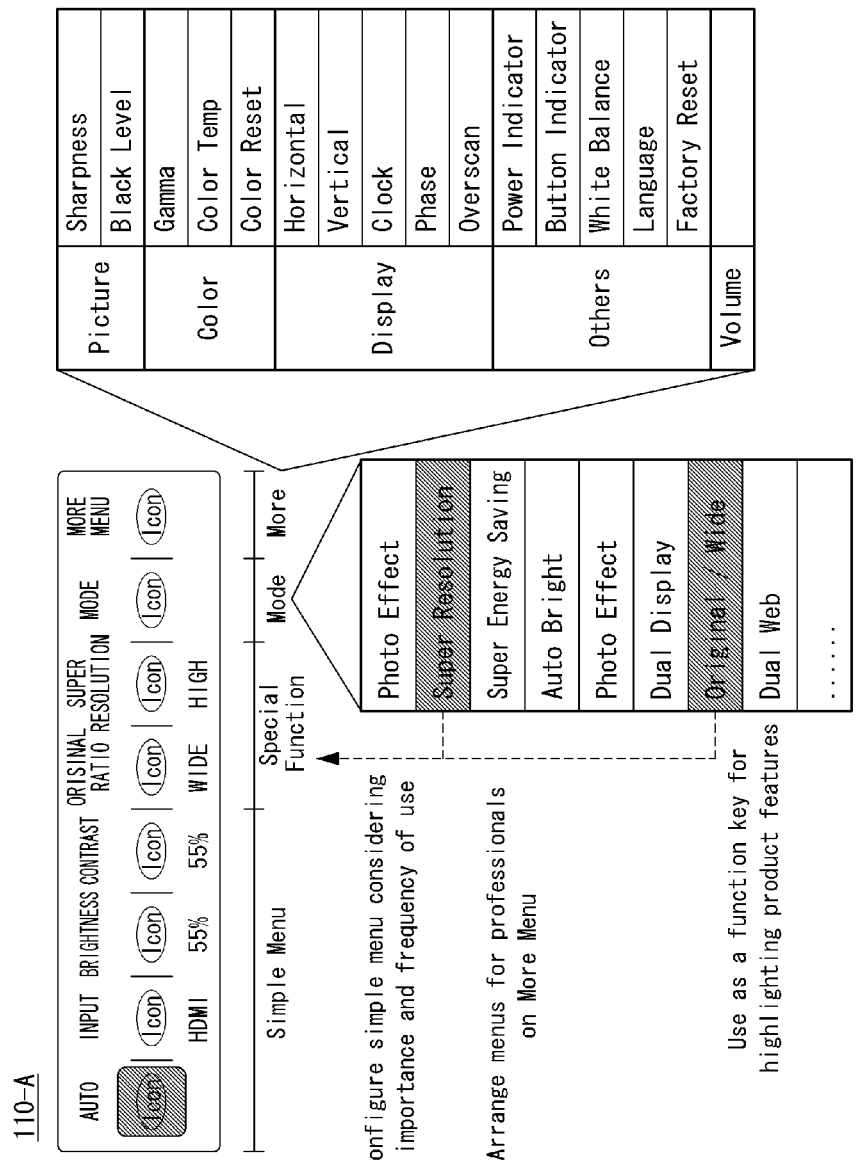
FIG. 47 illustrates one example of the structure of the menu of the electronic device.

FIG. 47 illustrates one example of the structure of the menu of the electronic device 100 of the present invention. Referring to FIG. 47, it can be seen that the menu of the electronic device 100, which is implemented through a monitor, is composed of a first menu (Simple Menu), a second menu (Special Function), a third menu (Mode), and a fourth menu (More).

The first menu can include configuration setting menus which are important and frequently used from the configuration setting menus. As illustrated in FIG. 47, the first menu can include auto adjusting menu (Auto) and brightness adjusting menu (Brightness). The second menu can include menus that can highlight the features of the electronic device 100. For example, as illustrated in FIG. 47, the second menu can include a high-resolution setting menu for providing more excellent resolution than other products (Super Resolution), and a menu for providing wide screens (Original/Wide) in the monitor 100.

The third menu can include menus for setting additional functions which are not normal monitor setting menus. The third menu, as described in FIG. 47, can include a menu for applying photographic effects (Photo Effect), energy saving menus (Super Energy Saving), etc. Also, the high-resolution setting menu for providing more excellent resolution (Super Resolution) and the menu for providing wide screens (Original/Wide) can be included in both the second and third menu in common.

The fourth menu can include menus which are not frequently used by general users but provide functions that are needed in the level of professionals. For example, the fourth menu can, as illustrated in FIG. 47, include a picture-related menu (Picture) including a menu for adjusting sharpness of the image on the screen (Sharpness), and a color menu (Color) including a menu for adjusting black level (Black Level), a menu for gamma correction (Gamma), a menu for adjusting color temperature (Color Temp) and a menu for resetting color (Color Reset).

Figure 48:
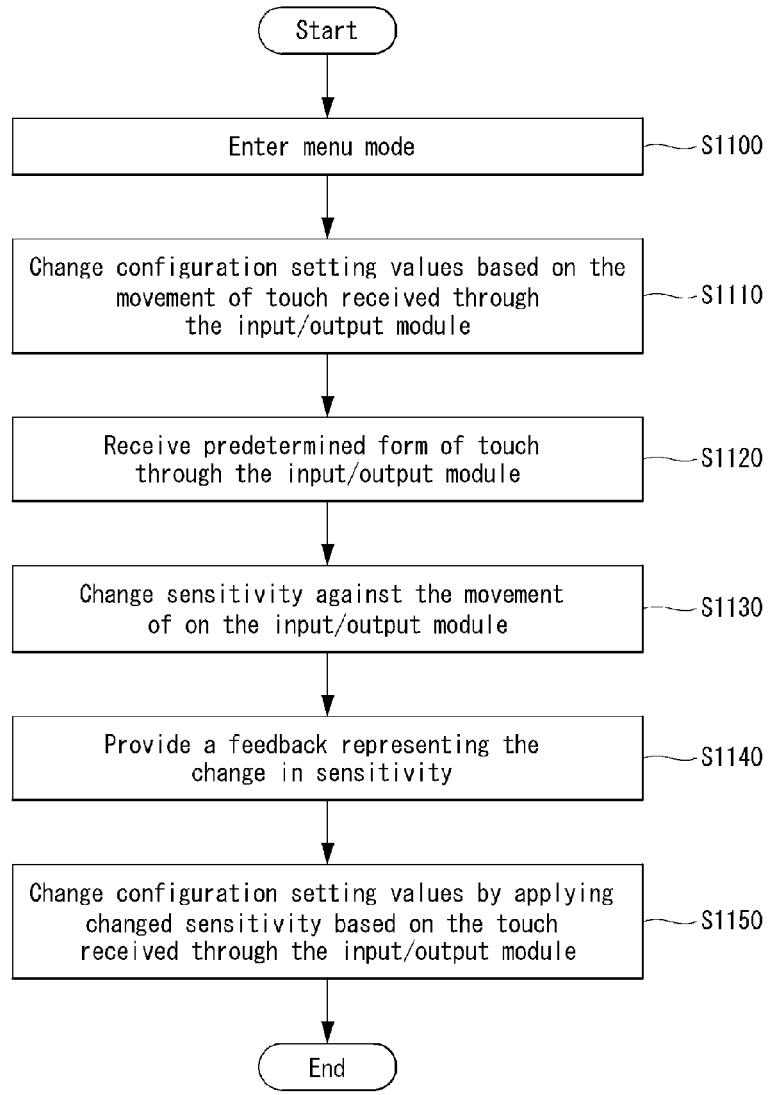
FIGS. 48-50 illustrate the process of setting a language for use in the electronic device based on the touch on the input/output module in the electronic device of the present invention.

FIG. 48 is a flow diagram illustrating the method of changing the configuration setting value of the electronic device 100 through a touch on the input/output device 200 in the electronic device 100 of the present invention. The method of changing the configuration setting value will now be described with reference to relevant drawings.

The electronic device 100 enters a menu mode (S1100). The controller 120 of the electronic device 100 can enable the menu mode of the electronic device 100 in response to a touch on the input/output device 200, a touch on an additional hardware key (not illustrated), or a touch on an additional software key (not illustrated).

When the electronic device 100 enters a menu mode, the user can change the configuration setting value of the electronic device 100 by moving the touch on the input/output device 200. In other words, the controller 120 can change the configuration setting value of the electronic device 100 based on the touch received through the input/output device 200 (S1110).

In this case, the input/output device 200 can also operate as a means for providing visual information separated from the display device 110 of the electronic device 100 as well as a means for inputting information through touch. For example, the input/output device 200 can be arranged on the bezel surrounding the display device 110, operating as a means for providing visual information apart from the display device 110.

Meanwhile, the configuration setting value of the electronic device 100 can include the brightness, contrast and resolution of the display device of the electronic device 100, and also the volume of the sound which is output from the audio output module 140 of the electronic device 100. However, the scope of the present invention is not limited to these types.

Meanwhile, the controller 120, upon receiving a predetermined type of touch through the input/output device 200 (S1120), changes the sensitivity on the change of the configuration setting value relative to the movement of the touch on the input/output device 200 (referred to as 'sensitivity of the configuration setting value') (S1130).

For example, if the configuration setting value had been changed by 1 against 1 mm of the movement of the touch on the input/output device 200 before the sensitivity of the configuration setting value changed, the configuration setting value can be changed by 1 against 1 cm of the movement of the touch on the input/output device 200 after the sensitivity of the configuration setting value changed. In other words, the user can change the configuration setting value more precisely if the sensitivity of the configuration setting value is lowered in response to a predetermined type of touch received through the input/output device 200.

On the other hand, the controller 120 can increase the sensitivity of the configuration setting value changed against the movement of the touch on the input/output device 200 in response to a predetermined type of touch received through the input/output device 200. Then, the user can change the configuration setting value more easily through short movement of the touch.

Meanwhile, the predetermined types of touch can include a long-touch on the input/output device 200 for a predetermined period of time, double-tap, a touch on a specific area of the input/output device 200. The present invention, however, is not limited to these types of touch.

When the sensitivity of the configuration setting value is changed, the controller 120 provides a feedback representing that the sensitivity of the configuration setting value has been changed (S1140). At this step, the feedback can be provided through at least one of the input/output device 200, the display device 110 of the electronic device 100, and the haptic module 150 of the electronic device 100.

After the sensitivity of the configuration setting value has been changed, the controller 120, upon receiving a movement of the user's touch on the input/output device 200, changes the configuration setting value based on the movement of the touch received through the input/output device 200 by reflecting the sensitivity changed (S1150).

At this step, the input/output device 200 can provide visual information reflecting the configuration setting value changed against the movement of the touch on the input/output device 200 by using the light provided based on at least emission of light and composition of emitted lights. Providing visual information of the input/output device 200 can be performed by various examples of the input/output device 200 as described before. So, explanation on the mechanism for providing visual information by the input/output device 200 is omitted.

Figure 49:
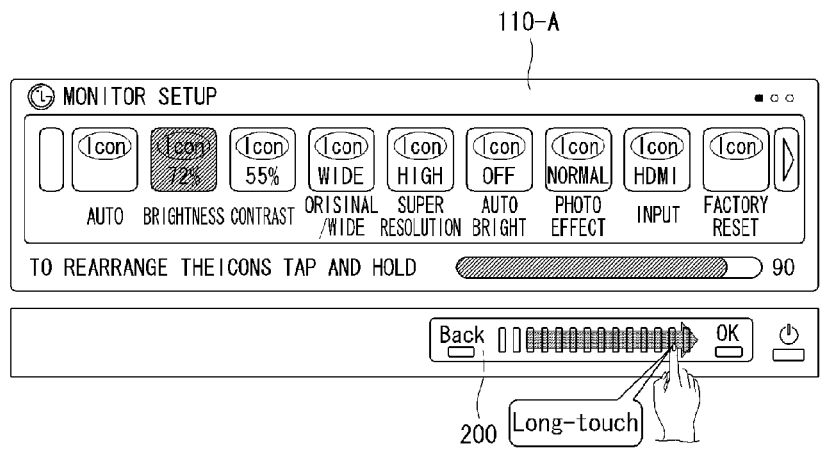
Figure 50:
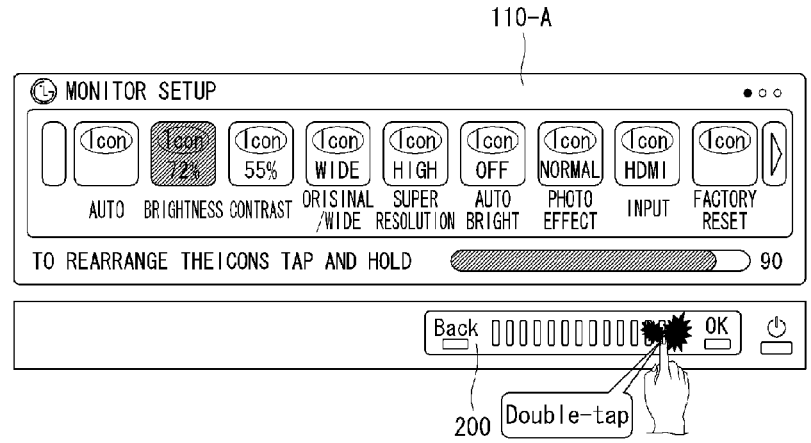
Figure 51:
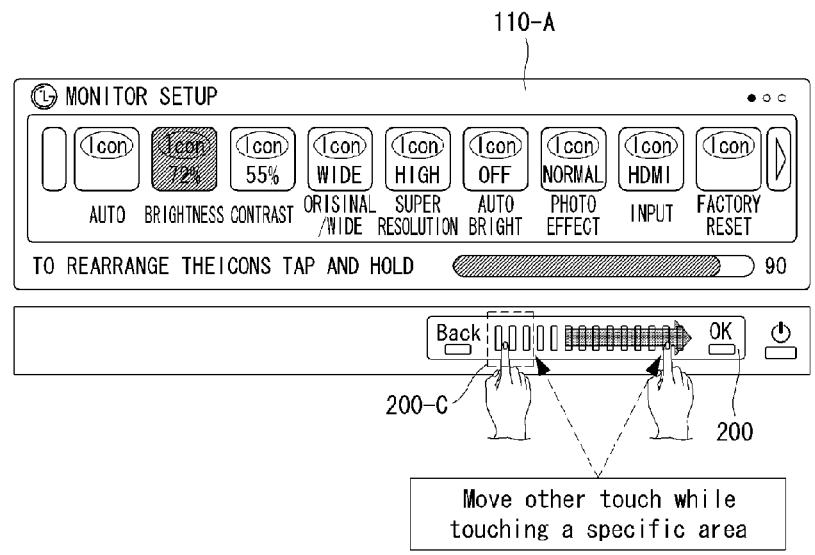

FIGS. 49-51 illustrate the types of touches for changing the sensitivity on the change of the configuration setting value against the movement of the touch on the input/output device 200 according to the method of changing the configuration setting value as illustrated in FIG. 48.

Referring to FIG. 49, it can be seen that the user, in the state where the electronic device 100 has entered a menu mode, long-touches a specific area of the input/output device 200 while changing the brightness of the display device 110 through the movement of the touch on the input/output device 200. Then, the controller 120 of the electronic device 100 can decrease the sensitivity on the change of brightness against the movement of the touch on the input/output device 200. Then, the user can change the brightness more precisely near the current brightness value of the display device 110.

Referring to FIG. 50, it can be seen that the user, in the state where the electronic device 100 has entered a menu mode, double-taps a specific area of the input/output device 200. Then, the controller 120 of the electronic device 100 can decrease the sensitivity on the change of brightness against the movement of the touch on the input/output device 200.

Referring to FIG. 51, it can be seen that the user, while touching on a specific area 200-C of the input/output device 200, moves another touch. Then, the controller 120 can change the brightness in response to the movement of the touch in the state where the sensitivity on the change of brightness is decreased.

Figure 52:
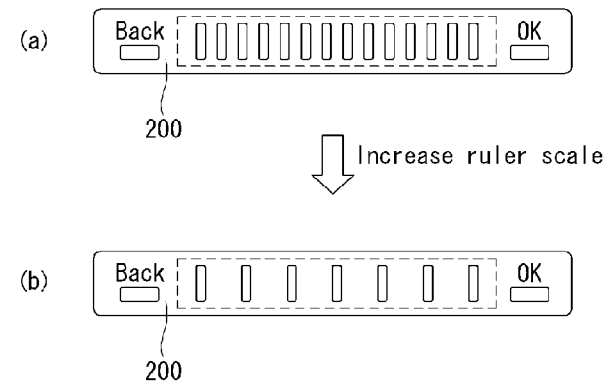
FIGS. 52 and 53 illustrate some examples showing that a feedback is provided through the input/output device, representing that the sensitivity on the change of the configuration setting value has been changed according to the method of changing the configuration setting value as illustrated in FIG. 48.
Figure 53:
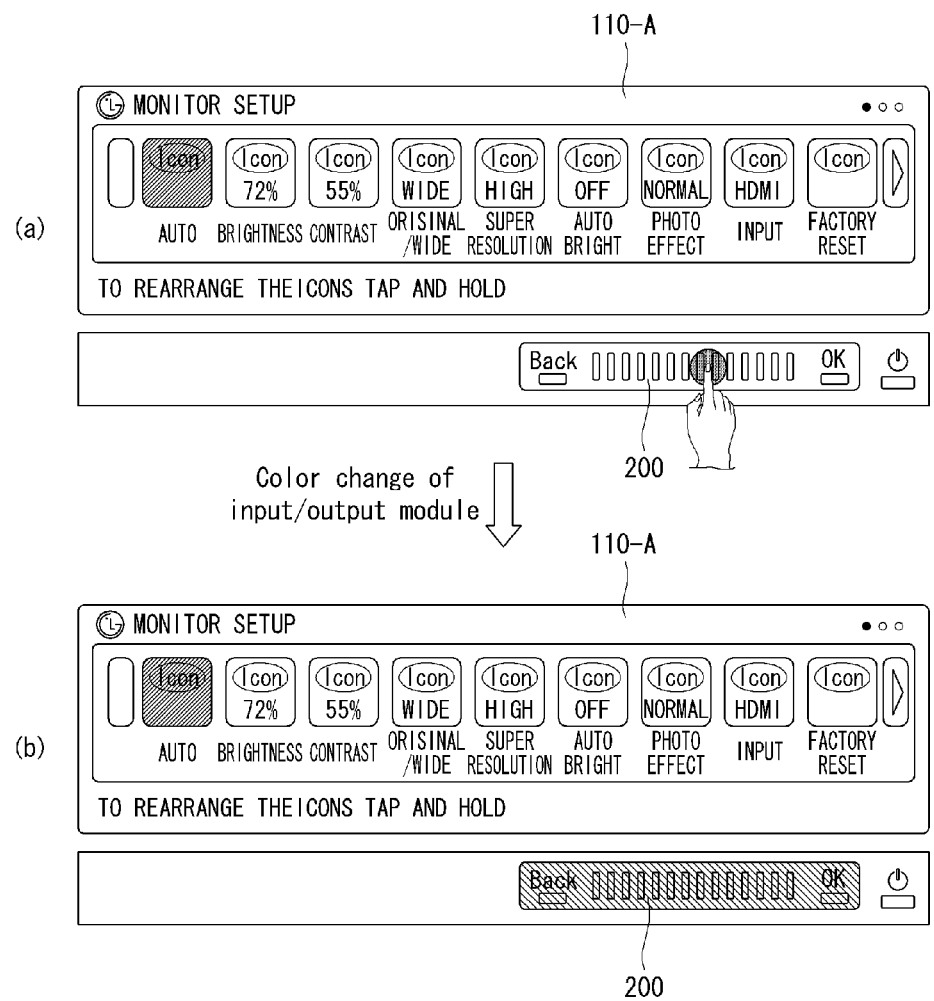

FIGS. 52 and 53 illustrate some examples showing that a feedback is provided through the input/output device 200, representing that the sensitivity on the change of the configuration setting value has been changed according to the method of changing the configuration setting value as illustrated in FIG. 48.

Comparing FIG. 52 (*a*) illustrating the state before the sensitivity of the configuration setting value has been changed, and FIG. 52 (*b*) illustrating the state after the sensitivity of the configuration setting value has been changed, it can be seen that the scale of the ruler provided through the input/output device 200 illustrated in FIG. 52 (*b*) has been enlarged, which means that the sensitivity of the configuration setting value has been diminished so that the change of the configuration setting value becomes small although the distance of movement of the user's touch is the same. Then, the user can change the configuration setting value more precisely as well as intuitively recognize the change of the sensitivity of the configuration setting value.

As illustrated in FIG. 52, the controller 120 can decrease the scale of the ruler provided through the input/output device 200 as the sensitivity of the configuration setting value increases.

Referring to FIG. 53, it can be seen that, when the user long-touches on the input/output device 200 while menu screen 10-A is displayed, the controller 120 of the electronic device 100 changes the sensitivity of the configuration setting value and, at the same time, provides a feedback representing the change of the sensitivity of the configuration setting value by changing the color provided through the input/output device 200.

This color change of the input/output device 200 can be maintained while the change of the sensitivity of the configuration setting value is maintained, or for a predetermined time. Also, the controller 120 can change the brightness of the light provided through the input/output device 200 when the sensitivity of the configuration setting value is changed. In other words, the controller 120 can change at least one of the color and brightness of the visual information provided through the input/output device 200 when the sensitivity of the configuration setting value is changed.

Also, the controller 120 can change the form of the visual information provided through the input/output device 200, or provide another type of visual information in order to represent the change of the configuration setting value.

Figure 54:
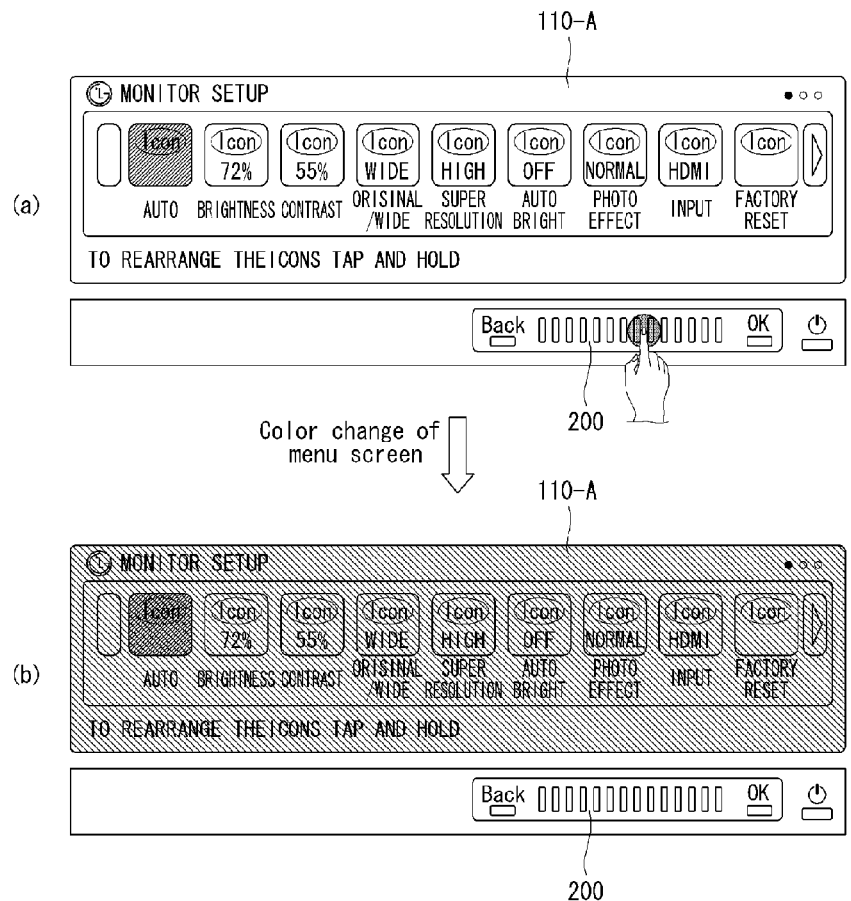
FIGS. 54 and 55 illustrate examples showing that a feedback is provided through the display device, representing that the sensitivity on the change of the configuration setting value has been changed according to the method of changing the configuration setting value as illustrated in FIG. 48.
Figure 55:
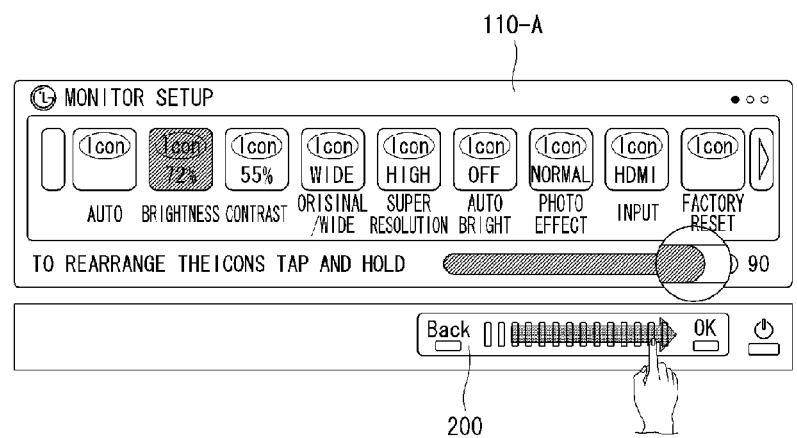

FIGS. 54 and 55 illustrate examples showing that a feedback is provided through the display device 110, representing that the sensitivity on the change of the configuration setting value has been changed according to the method of changing the configuration setting value as illustrated in FIG. 48.

Referring to FIG. 54, it can be seen that the controller 120 of the electronic device 100, when the user long-touches on the input/output device 200 while the menu screen 100-A is displayed, changes the sensitivity of the configuration setting value and provides a feedback representing that the sensitivity of the configuration setting value has been changed by changing the color of the menu screen 100-A.

This color change of the menu screen 100-A can be maintained while the change of the sensitivity of the configuration setting value is maintained, or for a predetermined time. Also, the controller 120 can change the brightness of the light provided through the input/output device 200 when the sensitivity of the configuration setting value is changed. In other words, the controller 120 can change at least one of the color and brightness of the visual information provided through the input/output device 200 when the sensitivity of the configuration setting value is changed.

Also, the feedback can be displayed by other images on the menu screen 100-A or on the area of the display device 110 other than the menu screen 100-A, which should not be interpreted to limit the scope of the present invention.

Referring to FIG. 55, it can be seen that the user, in the state where the electronic device 100 has entered a menu mode, long-touches on the input/output device 200 while changing the brightness of the display device 110 through a movement of the touch on the input/output device 200. Then, the controller 120 decreases the sensitivity of the configuration setting value and, at the same time, enlarges at least part of the menu screen (i.e., the screen for setting the configuration).

In this case, the at least part of the menu screen can be an area including the area representing the configuration setting value corresponding to the location of user's touch. As shown in FIG. 55, the configuration setting value corresponding to the location of the touch is a brightness of 90 of the display device, and the predetermined form is a circle. Then, the user can change the brightness more precisely by looking at the enlarged area near the brightness value of 90.

Figure 56:
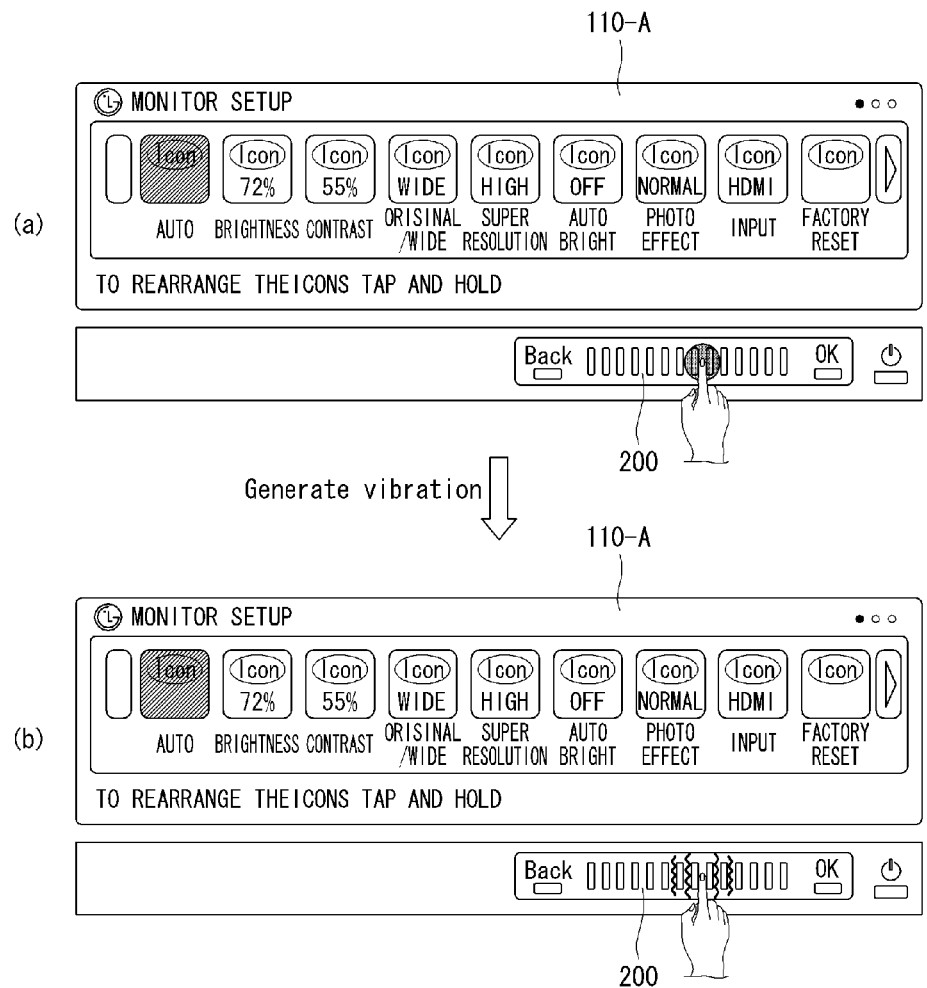
FIG. 56 illustrates that the feedback representing the change of the sensitivity on the change of the configuration setting value according to the method of changing the configuration setting value as illustrated in FIG. 48 is provided by the vibration through the input/output device.

FIG. 56 illustrates that the feedback representing the change of the sensitivity on the change of the configuration setting value according to the method of changing the configuration setting value as illustrated in FIG. 48 is provided by the vibration through the input/output device 200.

Referring to FIG. 56, it can be seen that, if the user long-touches on the input/output device 200 while the menu screen 100-A is displayed, the controller 120 of the electronic device 100 changes the sensitivity of the configuration setting value, and provide a feedback representing the change of the sensitivity on the change of the configuration setting value by generating a vibration through the haptic module include in the input/output device 200.

Figure 57:
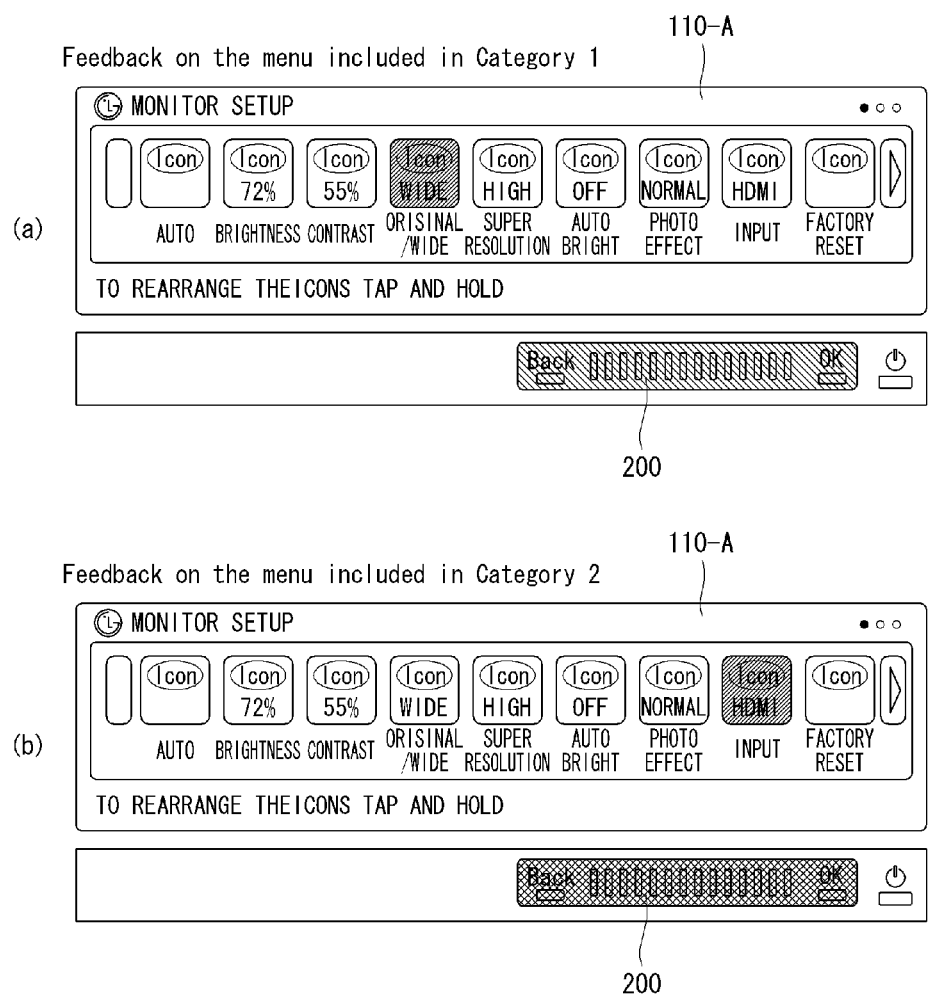
FIG. 57 illustrates that the feedback representing the change of the sensitivity on the change of the configuration setting value can be varied depending on the type of the configuration setting value in the method of changing the configuration setting value as illustrated in FIG. 48.

FIG. 57 illustrates that the feedback representing the change of the sensitivity on the change of the configuration setting value can be varied depending on the type of the configuration setting value in the method of changing the configuration setting value as illustrated in FIG. 48.

Referring to FIG. 57, the feedback representing the change of the sensitivity on the change of the configuration setting value can be varied depending on the category to which the selected menu belongs. More specifically, the controller 120 of the electronic device 100 of the present invention can vary the color of the light provided through the input/output device 200 depending on the type of the configuration setting value.

At this step, the category of the menu can be classified depending on the properties of the information set by the menu. For example, the menu category can be classified into a category related to adjusting the state of the display device 110 of the electronic device 100, a category related to setting external connections of the electronic device 100, and a category related to power consumption of the electronic device 100. The classification, however, should not be interpreted to limit the scope of the present invention.

The method of driving the electronic device 100 according to the present invention as described above can be implemented by computer programs in the way that can be performed by using various computer means, and recorded in computer-readable record media. The computer-readable record media can include the program commands, data files and data structures in a single structure or combination of many structures. The programs to be recorded in the media can be specially designed and constructed for the present invention, or publicly known programs in the field of computer software.

Examples of computer-readable recording media include magnetic media such as hard disk, floppy disk and magnetic tape, optical media such as CD-ROM and DVD, magneto-optical media such as floptical disks, and other hardware devices specially designed to store and execute program commands such as ROM, RAM and flash memory. Examples of programs include machine language codes generated by compilers and high level language codes that can be executed on the computer by using interpreters. The hardware devices for the operation of the present invention can be implemented by one or more of software modules, and the reverse is also possible.

Although the present invention has been described for limited embodiments with reference to drawings, the present invention is not limited to the embodiments described above, and those skilled in the art of the present invention will be able to make correction or modification from the description of the present invention.

Therefore, the scope of the present invention should not be limited to the examples described above, and should be interpreted by the claims attached and equivalents thereof.

INDUSTRIAL APPLICABILITY

In accordance with this document, there is provided the electronic device makes users intuitively recognize the operating states of an electronic device by checking the color information provided by the input/output module included in the electronic device, and intuitively recognize the result of control of the operating states of an electronic device by checking the color information reflecting the result of control of the operating states of an electronic device provided by the input/output module included in the electronic device. Also, in accordance with this document, there is provided the electronic device makes the users change the configuration setting value based on the movement of the touch on the input/output module included in the electronic device. Also, in accordance with this document, there is provided the electronic device makes the users set sensitivity of the change of the configuration setting value based on the predetermined form of the touch on the input/output module.

The invention claimed is:

1. An electronic device comprising:
a display device having a screen;
an input/output device configured to be separated from the display device and configured to provide visual information and to receive input information via a touch; and
a controller operatively connected to the display device and the input/output device, the controller configured to change a configuration setting value based on a movement of the touch on the input/output device,
wherein a sensitivity of the change of the configuration setting value varies in accordance with a predetermined form of the touch,
wherein the visual information reflects the configuration setting value changed based on the movement of the touch on the input/output device; and
wherein the input/output device is configured to provide visual information including at least one of a light brightness level and a light color composition.

2. The electronic device of claim 1, wherein, upon receiving the predetermined form of the touch through the input/output device, the controller is configured to provide a feedback through at least one of the display device and the input/output device, the feedback representing that the sensitivity has been changed.

3. The electronic device of claim 1, further comprising:
a haptic module operatively connected to the controller and configured to generate a vibration representing that the sensitivity has been changed in response to the predetermined form of the touch.

4. The electronic device of claim 2, wherein the controller is configured to change a scale of a ruler provided through the input/output device when the sensitivity is changed in response to the predetermined form of the touch.

5. The electronic device of claim 2, wherein the controller is configured to change at least one of a color, a brightness and a form of the visual information provided through at least part of the display device and the input/output device when the sensitivity is changed in response to the predetermined form of the touch.

6. The electronic device of claim 2, wherein the controller is configured to enlarge at least part of the screen for representing the configuration setting value when the sensitivity is changed in response to the predetermined form of the touch.

7. The electronic device of claim 6, wherein the enlarged at least part of the screen is an area in the screen with a predetermined form including an area representing the configuration setting value corresponding to a location of the touch received through the input/output device.

8. The electronic device of claim 2, wherein the controller is configured to output different feedbacks depending on types of the configuration setting value that are to be changed.

9. The electronic device of claim 1, wherein the input/output device is configured to be arranged on a bezel surrounding the display device.

10. The electronic device of claim 1, wherein the input/output device comprises:
a touch sensing module configured to receive the touch;
at least one light emitting module configured to emit light of at least one specific color; and
a light guiding module configured to guide the light emitted from the at least one light emitting module and including a light penetrating area on at least a part of the light guiding module, and wherein the controller changes at least one of the light color composition and the light brightness level based the touch received through the input/output device.

11. A method for driving an electronic device which comprises a display device having a screen, and an input/output device which is separated from the display device and which provides visual information and inputs information via a touch, the method comprising:

changing, by the electronic device, a configuration setting value of the electronic device based on a movement of the touch on the input/output device, wherein a sensitivity of the change of the configuration setting value varies in accordance with a predetermined form of the touch, wherein providing visual information reflects the configuration setting value changed based on the movement of the touch on the input/output device, the visual information including at least one of a light brightness level and a light color composition.

12. The method for driving an electronic device of claim 11, further comprising:

providing a feedback, through at least one of the display device and the input/output device, representing that the sensitivity has been changed in response to the predetermined form of the touch.

13. The method for driving an electronic device of claim 11, further comprising:

controlling a haptic module of the electronic device to generate a vibration representing that the sensitivity has been changed in response to the predetermined form of the touch.

14. The method for driving an electronic device of claim 12, wherein providing the feedback comprises:

changing a scale of a ruler provided through the input/output device in response to the predetermined form of the touch.

15. The method for driving an electronic device of claim 12, wherein providing the feedback comprises:

changing at least one of a color, a brightness and a form of the visual information provided through at least part of the display device and the input/output device in response to the predetermined form of the touch.

16. The method for driving an electronic device of claim 12, wherein providing the feedback comprises:

enlarging at least part of the screen for setting the configuration setting value in response to the predetermined form of the touch.

\* \* \* \* \*